United States Patent
Kibune et al.

(10) Patent No.: US 7,508,892 B2
(45) Date of Patent: Mar. 24, 2009

(54) RECEIVER CIRCUIT COMPRISING EQUALIZER

(75) Inventors: Masaya Kibune, Kawasaki (JP); Hirotaka Tamura, Kawasaki (JP)

(73) Assignee: Fujitsu Limited, Nakahara-Ku, Kawasaki-Shi, Kanagawa (JP)

( * ) Notice: Subject to any disclaimer, the term of this patent is extended or adjusted under 35 U.S.C. 154(b) by 694 days.

(21) Appl. No.: 11/050,175

(22) Filed: Feb. 4, 2005

(65) Prior Publication Data

US 2005/0226355 A1    Oct. 13, 2005

(30) Foreign Application Priority Data

Apr. 9, 2004    (JP)    ............... 2004-115590

(51) Int. Cl.
*H03D 1/06* (2006.01)

(52) U.S. Cl. ...................................... 375/348

(58) Field of Classification Search ................ 375/348, 375/229, 346, 233, 232; 327/355, 354, 292
See application file for complete search history.

(56) References Cited

U.S. PATENT DOCUMENTS

| | | |
|---|---|---|
| 4,547,888 A | 10/1985 | Ryan et al. |
| 4,789,994 A | 12/1988 | Randall et al. |
| 5,517,213 A * | 5/1996 | Bhatt et al. ............. 375/232 |
| 2004/0228397 A1* | 11/2004 | Bach ...................... 375/232 |

FOREIGN PATENT DOCUMENTS

| | | |
|---|---|---|
| JP | 60-041332 A | 3/1985 |
| JP | 06-204902 A | 7/1994 |
| JP | 6-204944 | 7/1994 |
| JP | 2000-049665 A | 2/2000 |
| JP | 2001-256728 A | 9/2001 |
| JP | 2003-45121 | 2/2003 |
| JP | 2003-59186 | 2/2003 |

* cited by examiner

*Primary Examiner*—Khai Tran
(74) *Attorney, Agent, or Firm*—Fujitsu Patent Center

(57) ABSTRACT

A receiver circuit has an equalizer that equalizes a received signal propagating through a transmission medium; a data detection circuit that detects an analog output signal of the equalizer at a data sample timing and outputs a digital signal; an intersymbol interference detection circuit that detects an intersymbol interference level from the analog output signal of the equalizer at the data sample timing and from the digital signal of the data detection circuit; and an equalization characteristic control unit that controls the characteristic of the equalizer to minimize the detected intersymbol interference level. The receiver circuit further has a data sample timing control unit in which the data sample timing is controlled to a sample timing at which the difference between the amplitude of the analog output waveform of the equalizer with respect to an impulse and the amplitude of an ideal impulse response waveform is minimal.

13 Claims, 20 Drawing Sheets

FIRST EMBODIMENT

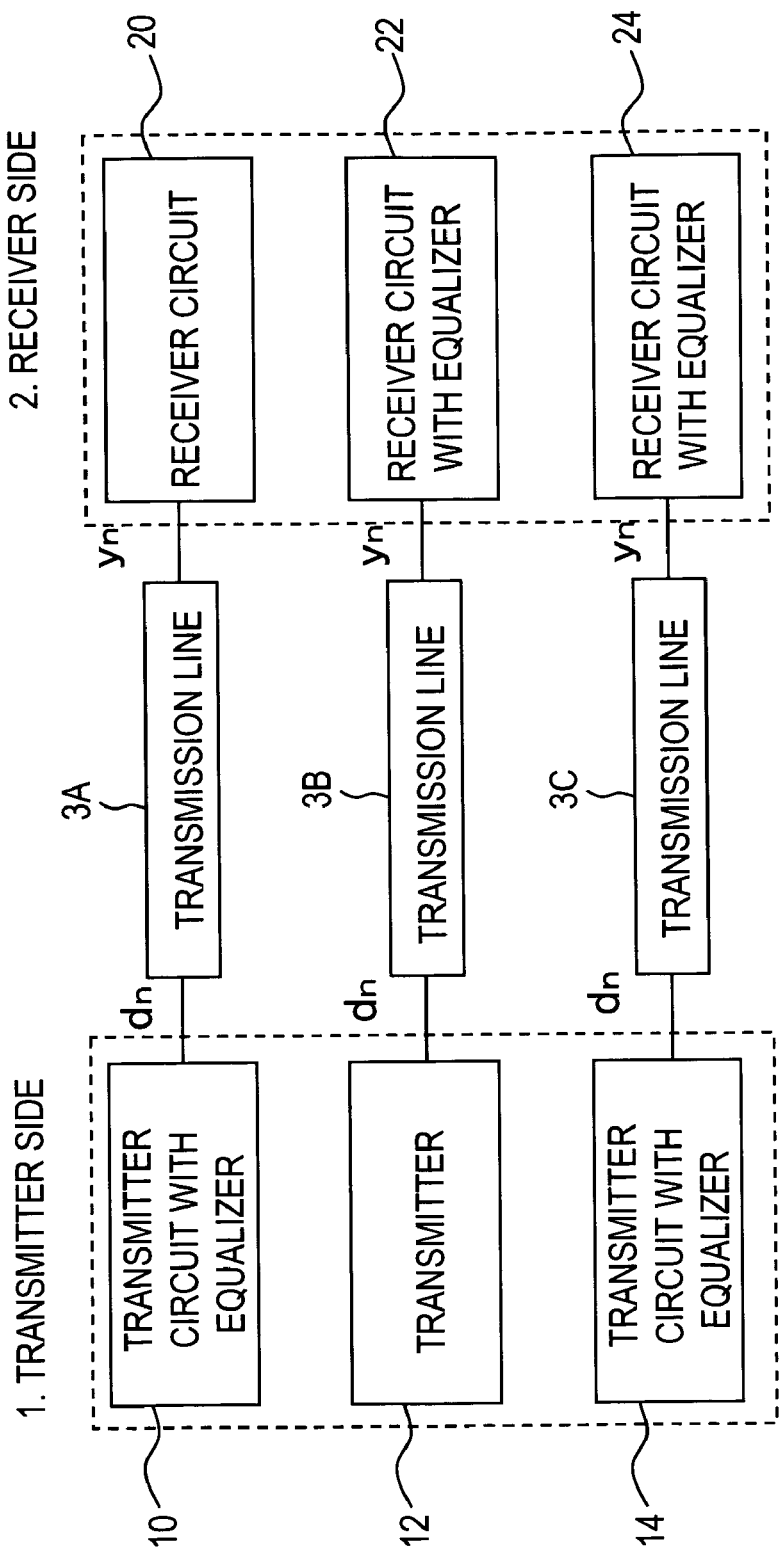
FIG. 1  DEPOSITION OF TRANSMISSION LINE AND EQUALIZER

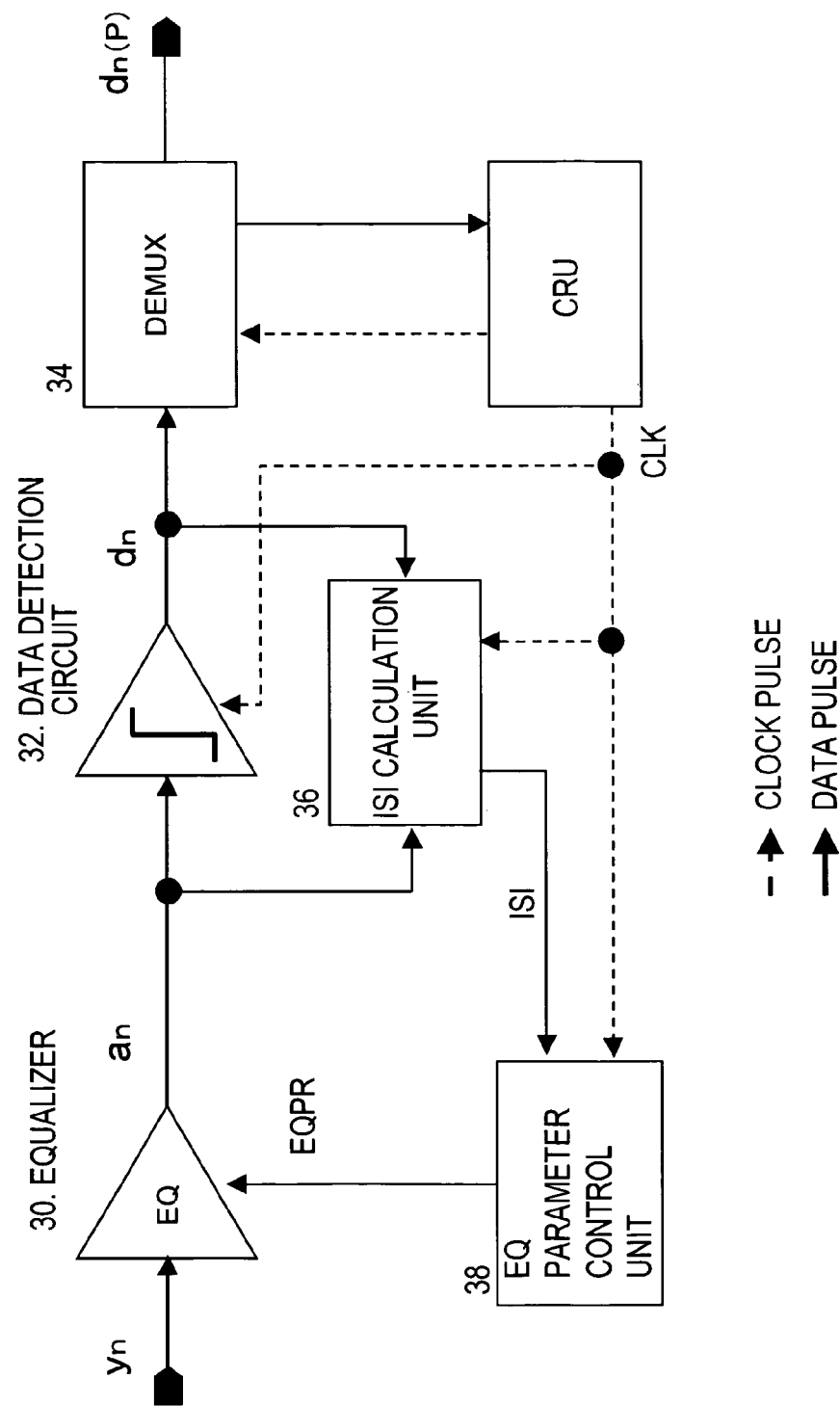

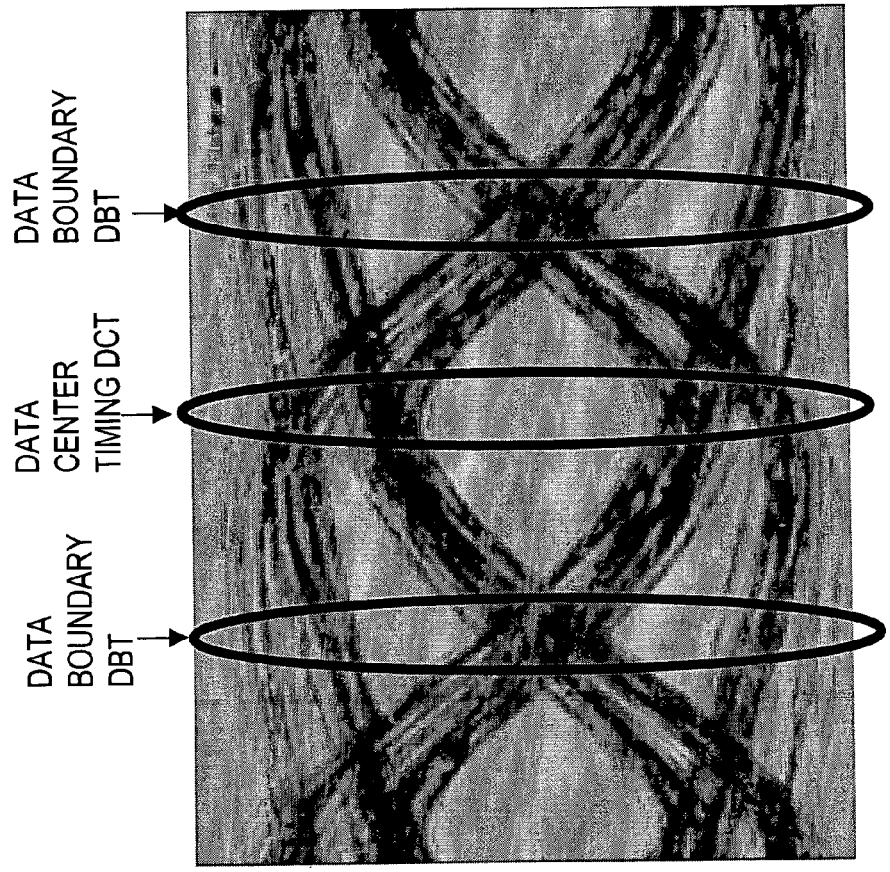
FIG. 3 EXAMPLE OF ANALOG OUTPUT SIGNAL OF EQUALIZER

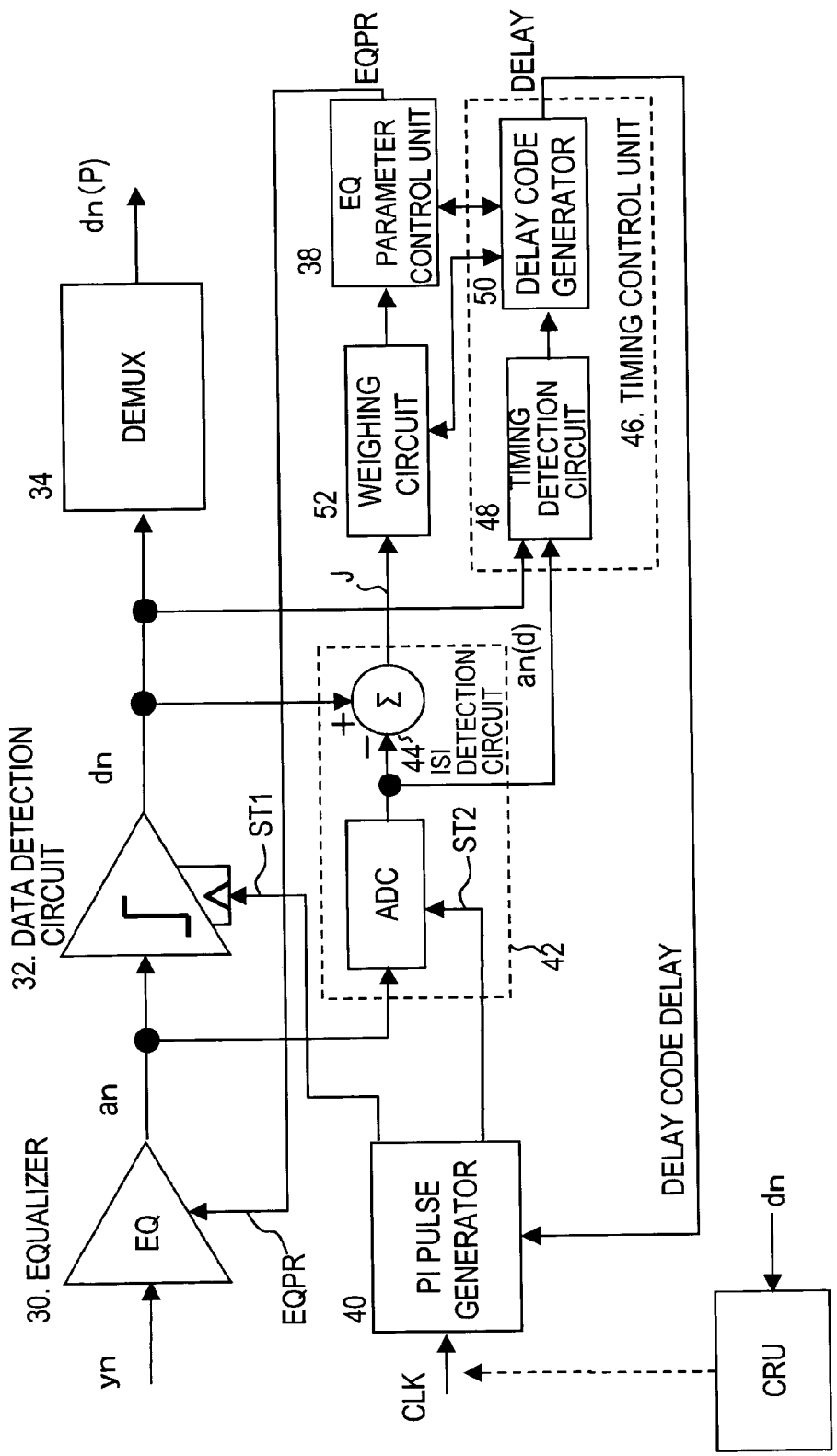
FIG. 5 FIRST EMBODIMENT

EXAMPLE OF EQUALIZER

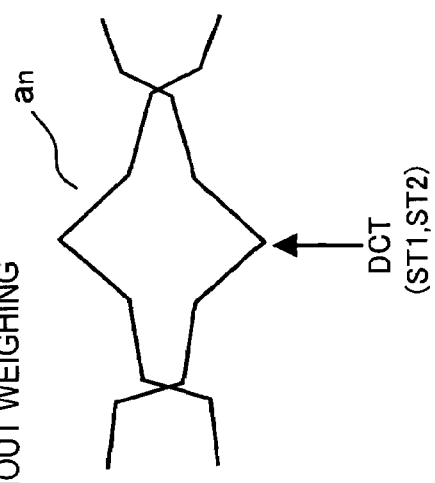
FIG. 9A  WITHOUT WEIGHING
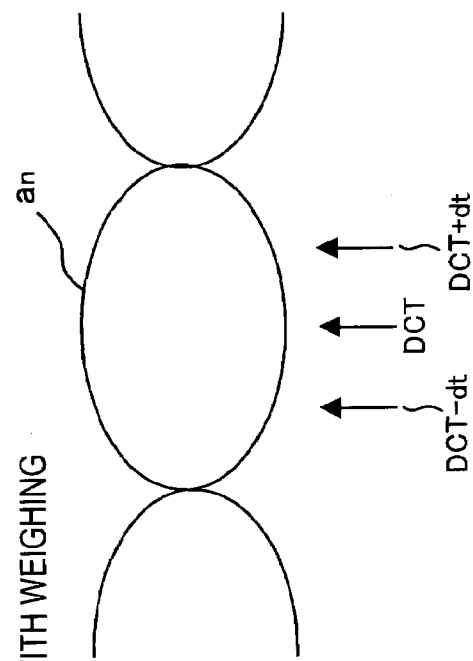
FIG. 9B  WITH WEIGHING

RECEIVER CIRCUIT OF SECOND EMBODIMENT (1)

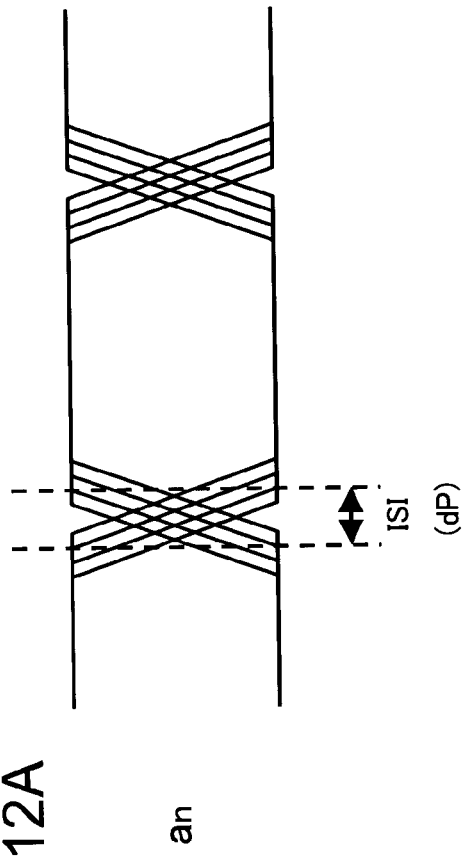
FIG. 12A THEORETICAL DIAGRAM OF SECOND EMBODIMENT
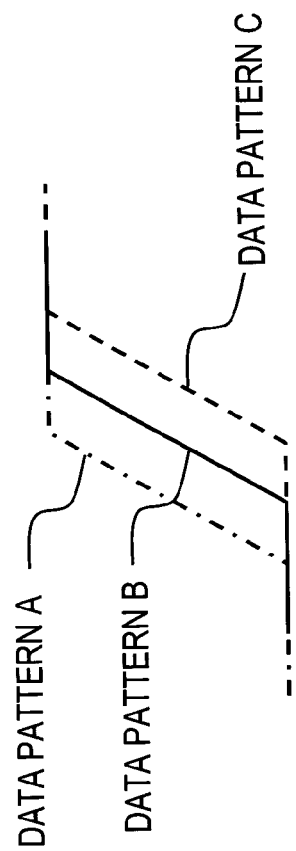
FIG. 12B THEORETICAL DIAGRAM OF
SECOND EMBODIMENT
● : CP
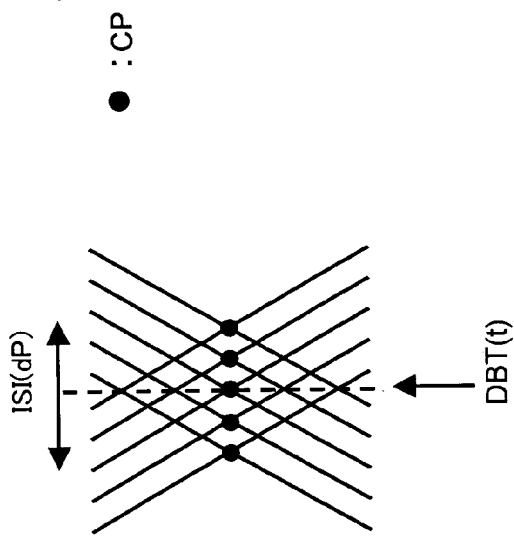
FIG. 13A
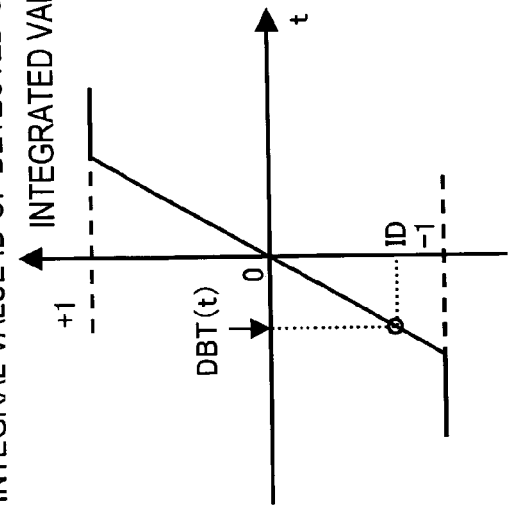
RELATION BETWEEN SAMPLE TIMING DBT
AND INTEGRAL VALUE ID OF DETECTED OUTPUT
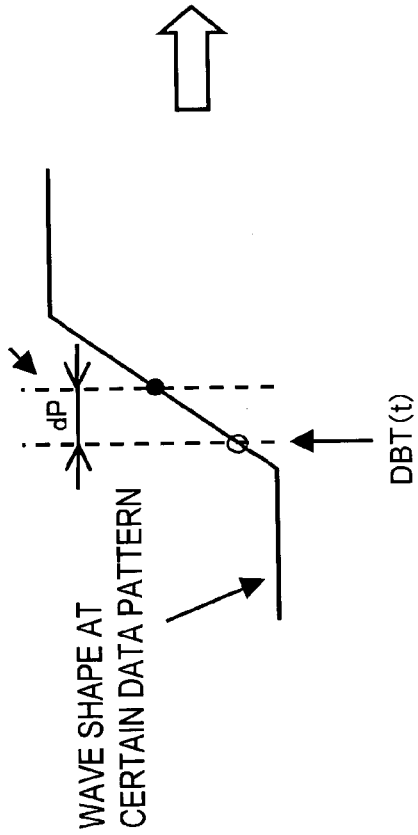
FIG. 13B

RECEIVER CIRCUIT OF SECOND EMBODIMENT (2)

RECEIVER CIRCUIT OF SECOND EMBODIMENT (3)

THEORETICAL DIAGRAM FOR
RECEIVER CIRCUIT OF FIG. 15

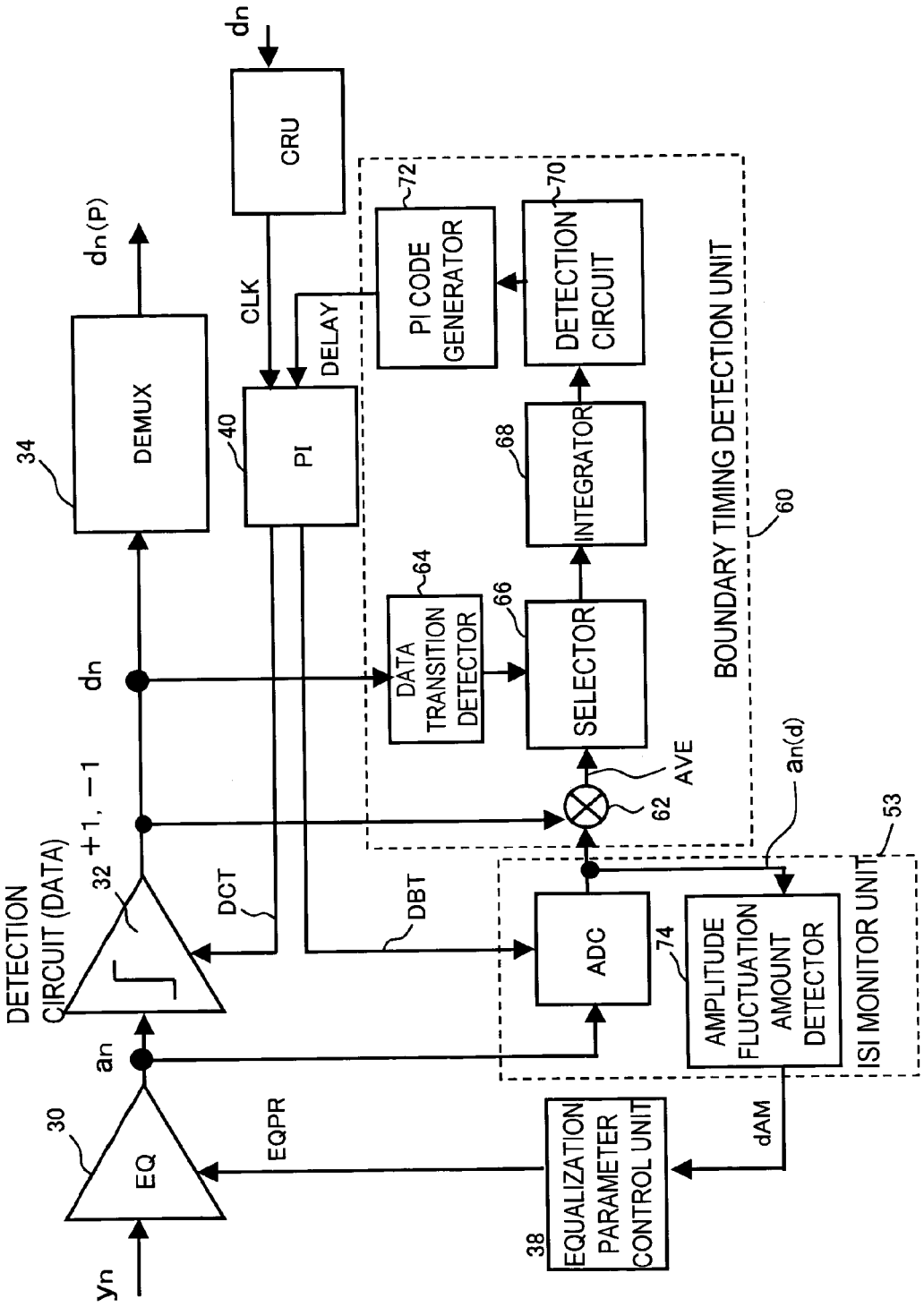

THEORETICAL DIAGRAM OF THIRD EMBODIMENT

EYE PATTERN AT BOUNDARY BEFORE EQUALIZATION

EYE PATTERN AT BOUNDARY AFTER EQUALIZATION

RECEIVER CIRCUIT COMPRISING EQUALIZER

CROSS-REFERENCE TO RELATED APPLICATIONS

This application is based upon and claims the benefit of priority from the prior Japanese Patent Application No. 2004-115590, filed on Apr. 9, 2004, the entire contents of which are incorporated herein by reference.

BACKGROUND OF THE INVENTION

1. Field of the Invention

The present invention relates to a receiver circuit comprising an equalizer that monitors intersymbol interference and whose characteristics are controlled to suppress the intersymbol interference and, more particularly, to a receiver circuit that is adapted to allow suitable equalization of a received waveform with a high data rate by means of an equalizer.

2. Description of the Related Art

In cases where signal transmission between LSI chips, signal transmission between elements in a chip or between circuit blocks, or signal transmission between circuit boards, or the like, is performed at high speed, Intersymbol Interference (ISI) occurs in the transmission lines, which produces distortion in the received waveform. When the transmission line bandwidth is not adequately high enough in comparison with the data rate, ISI arises due to loss of the high frequency component of the signal waveform and affects the signal waveform at a past or future time such that the impulse response of the received waveform has a low foot. This effect is ISI. That is, the ISI of a past or future pulse signal appears in a received waveform at a certain time that has propagated through the transmission line. Due to the occurrence of this ISI, the transmittable/receivable transmission distance is shortened or the transmittable/receivable data rate is reduced. Hence, compensation for ISI in high-speed signal transmission is required.

Such suppression of the ISI of a received signal is generally also performed in a reception/playback circuit of communication, for example, as shown in Japanese Patent Application Laid Open No. H6-204911 (disclosed on Jul. 22, 1994), for example. This conventional technology is provided with a root-cosine rolloff filter in order to suppress ISI.

Further, an adaptive equalizer is also illustrated in Japanese Patent Applications Laid Open Nos. 2003-059186 and 2003-045121, for example.

In order to compensate the ISI of a transmission line, an equalizer that provides an inverse characteristic for the transmission line is disposed on the transmission side or reception side of the transmission line or on both sides thereof. By providing an equalizer on the transmission side of the transmission line to wave-shape (equalize the waveform of) the transmitted pulse signal, waveform distortion caused by ISI is not produced on the reception side, whereby the ISI of the transmission line can be suppressed to a certain degree. However, when the characteristic of the transmission line varies with time, for example, simply providing an equalizer with a fixed characteristic on the transmission side is insufficient for ISI compensation. When the transmission line characteristic fluctuates, an equalizer must be provided on the reception side, the output of the equalizer must be monitored and the characteristic of the equalizer must be minutely adjusted to establish the inverse characteristic of the transmission line. As a result, even when fluctuations of the transmission line characteristic occur, optimal equalization can be performed on the reception side by adapting to such fluctuations.

One possibly considered method for adjusting the characteristic of the equalizer provided on the reception side is to generate an ISI evaluation function that indicates the degree of the ISI from the output of the equalizer to control the characteristic parameters of the equalizer to minimize the ISI. With this method, the ISI evaluation function must be generated by sampling the signal waveform at the data center timing substantially at the center of a data eye that comprises a plurality of received signal waveforms in which variation is present. When the data rate is low, the sample timing adjustment to the center timing of the data eye can be performed relatively easily but, as the data rate increases, the cycle (unit interval: UI) of the signal waveform grows shorter and, therefore, highly accurate adjustment of the sample timing adjustment to the center timing of the data eye is problematic. Hence, it is difficult to determine an ISI evaluation function at an appropriate sample timing and therefore difficulties with suitable ISI compensation using the equalizer characteristic adjustment method above are to be expected.

SUMMARY OF THE INVENTION

Accordingly, an object of the present invention is to provide a receiver circuit that permits suitable adjustment of the characteristic of an equalizer that equalizes a received pulse signal with a high data rate.

In order to achieve the above object, a first aspect of the present invention is a receiver circuit comprising an equalizer that equalizes a received signal that propagates through a transmission medium; a data detection circuit that detects an analog output signal of the equalizer at a data sample timing and outputs a digital signal; an intersymbol interference detection circuit that detects an intersymbol interference level from the analog output signal of the equalizer at the data sample timing and from the digital signal of the data detection circuit; and an equalization characteristic control unit that controls the characteristic of the equalizer to minimize the intersymbol interference level detected by the intersymbol interference detection circuit. The receiver circuit further comprises a data sample timing control unit in which the data sample timing is controlled to a sample timing at which the difference between the amplitude of the analog output waveform of the equalizer with respect to an impulse and the amplitude of an ideal impulse response wave form is minimal. The appropriate data sample timing can be detected by the data sample timing control unit and therefore the intersymbol interference level can be detected at the sample timing thus detected and the equalization characteristic of the equalizer can be optimally controlled, whereby compensation for the intersymbol interference can be implemented.

In order to achieve the above object, a second aspect of the present invention is a receiver circuit comprising an equalizer that equalizes a received signal that propagates through a transmission medium; a data detection circuit that detects, at a data sample timing, an analog output signal of the equalizer and outputs a digital signal; and an equalization characteristic control unit that detects a phase fluctuation amount at the data boundary of the analog output signal of the equalizer and controls the characteristic of the equalizer to reduce the phase fluctuation amount at the data boundary. The equalization characteristic control unit monitors the degree of ISI according to the phase fluctuation amount at the data boundary of the analog output signal of the equalizer and adjusts the equalizer characteristic to reduce the phase fluctuation amount at the data boundary. Therefore, data-eye center timing need not be controlled highly precisely even in the case of a signal with a high data rate and the equalization characteristic of the equalizer can be optimized simply, whereby compensation for the intersymbol interference can be implemented.

In order to achieve the above object, a third aspect of the present invention is a receiver circuit comprising an equalizer that equalizes a received signal that propagates through a transmission medium; a data detection circuit that detects an analog output signal of the equalizer at a data sample timing and outputs a digital signal; and an equalization characteristic control unit that detects the amplitude fluctuation amount at the data boundary of the analog output signal of the equalizer and controls the characteristic of the equalizer to reduce the amplitude fluctuation amount at the data boundary. The equalization characteristic control unit monitors the degree of the ISI according to the amplitude fluctuation amount of the analog output signal at the data boundary of the analog output signal of the equalizer and adjusts the equalizer characteristic to reduce this amplitude fluctuation amount. Accordingly, the center timing of the data eye need not be controlled highly accurately even in the event of a signal with a high data rate and the characteristic of the equalizer can be optimized simply, whereby compensation of intersymbol interference can be implemented.

The present invention is able to provide a receiver circuit comprising an equalizer that suitably suppresses intersymbol interference even in the event of a received pulse signal with a high data rate.

BRIEF DESCRIPTION OF THE DRAWINGS

FIG. 1 shows an example of the disposition of the transmission line and equalizer to which this embodiment is applied;

FIG. 2 shows a general constitutional example of a receiver circuit that comprises an equalizer;

FIG. 3 shows an example of an analog output signal waveform of the equalizer;

FIG. 5 is a constitutional view of the receiver circuit of a first embodiment;

FIG. 9 illustrates the operating principles of a weighting circuit with respect to an ISI evaluation function J;

FIG. 12 is a theoretical diagram of the second embodiment;

FIG. 13 is a theoretical diagram of the second embodiment;

FIG. 17 shows the receiver circuit of a third embodiment;

DESCRIPTION OF THE PREFERRED EMBODIMENTS

Figure 4A:
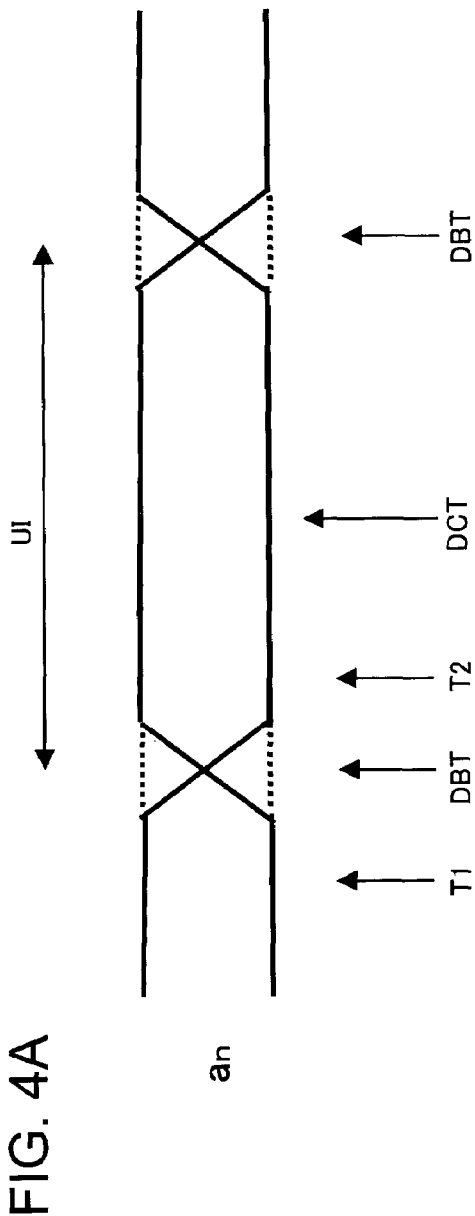
FIG. 4 illustrates the timing for a data decision.

Embodiments of the present invention will be described hereinbelow with reference to the drawings. However, rather than the technological scope of the present invention being limited to or by these embodiments, the technological scope covers the items appearing in the claims as well as any equivalents thereof.

FIG. 1 shows an example of the disposition of the transmission line and equalizer to which this embodiment is applied. Pulse transmission signals dn transmitted from the transmission side 1 propagate through transmission lines 3A to 3C, which are the transmission media, and then received on the reception side 2 as received signals yn. The received signals yn undergo the effects of intersymbol interference (ISI) as a result of the transmission characteristic of the transmission lines and therefore undergo wave form distortion. Further, there are cases where the transmitter circuits 10 to 14 on the transmission side 1 also transmit synchronization clocks in addition to the transmission signals dn, and also cases where synchronization clocks are regenerated from the received signal yn on the reception side 2 instead of the transmission side transmitting the synchronization clock.

The transmitter circuit 10 sometimes comprises an equalizer in order to shape the waveform of the transmission signal dn on the transmission side beforehand so that the effect of ISI is not contained in the received signal yn. The equalizer in the transmitter circuit is designed with characteristics suited to the characteristics of the transmission line 3A. That is, the equalization characteristic in the transmitter circuit is set beforehand. However, when the characteristics of the transmission line differ from the expected characteristics because the actual received signal cannot be monitored, ISI cannot be suitably suppressed.

When, on the other hand, the transmitter circuit 12 does not comprise the equalizer but the receiver circuit 20 comprises the equalizer, the effects of the ISI on the received signal yn can be removed by means of the receiver circuit 20. In addition, an example of a transmitter circuit 14 comprises an equalizer and, at the same time, a transmitter circuit 24 also comprises an equalizer. Therefore, the equalizer is provided on either the transmission side or reception side or on both sides but, when the transmission line has a characteristic that varies as time elapses, the equalizer must be provided on the reception side to equalize the waveform in conformance with the received signal yn.

FIG. 2 shows a general constitutional example of a receiver circuit that comprises an equalizer. The received signal yn is inputted to an equalizer 30, undergoes waveshaping to suppress ISI on the basis of the equalization characteristic that is set by means of the equalization characteristic parameter EQPR, and is outputted as an analog output signal an. The signal level is latched at the center timing of the data eye by means of a data detection circuit 32 before being outputted as a digital signal dn. The serially generated digital signal dn is serial-to-parallel converted by means of a demultiplexer 34 and then outputted as a parallel digital signal dn(P). A clock recovery unit CRU detects the timing of a data transition (from data 0 to 1 or from data 1 to 0) of the digital signal dn that is the output of the detection circuit 32 and regenerates the synchronization clock on the transmission side. The synchronization clock CLK thus regenerated is then supplied to each circuit, unit, and the like, in the receiver circuit.

In the receiver circuit of FIG. 2, the equalizer 30 suitably controls the equalization parameter EQPR by means of an equalization parameter control unit 38 to permit appropriate control of ISI. The equalization parameter control unit 38 receives ISI information generated by an ISI calculation unit 36 and appropriately controls the equalization parameter EQPR on the basis of this ISI information. The ISI calculation unit 36 calculates a predetermined ISI evaluation function from the analog output signal an of the equalizer 30 and the digital output signal dn of the data detection circuit 32 and then supplies the calculation result to the equalization parameter control unit 38 as the ISI information.

FIG. 3 shows examples of waveforms of analog output signals of the equalizer. In FIG. 3, analog output signals corresponding with a plurality of data patterns are displayed on top of one another (eye pattern). In the case of a signal whose data transits, the data makes the transition from the high level to the low level or from the low level to the high level at the data boundaries and assumes the low level or high level at the data center timing DCT between the data boundaries DBT. Thus, a signal waveform in which the high level and low level can be distinguished at the data center timing DCT in this way is known as a data eye and, therefore, the correct digital signal dn can be judged by making a data detection at the data center timing DCT of the data eye. Further, a signal with a high level or low level at the data boundaries DBT is an example of a data pattern in which data does not make a transition, the level thereof instead remaining at the high level or the low level.

Because ISI is generated in the transmission line, the waveform of a received signal is disturbed as shown in FIG. 3 and sometimes an appropriate data detection can no longer be made at the data center timing. In order to avoid this phenomenon, waveshaping is performed by an equalizer to suppress the ISI. An equalizer performs waveshaping to remove the ISI of the signal of a preceding bit by adjusting the amplitude of the current signal and the amplitude of a signal lying one to several bits prior to the current signal by means of predetermined equalization parameters and synthesizing them. Because the ISI level differs depending on the characteristics of the transmission line, ISI can be appropriately suppressed by the equalizer by suitably adjusting the equalization parameter thereof in accordance with the transmission line characteristic.

FIG. 4 illustrates the timing for a data detection. FIG. 4A is a signal waveform in a case where the data rate is low. Because one cycle UI is long, a data detection can be performed adequately simply by setting the data center timing DCT at an optional timing between the data boundary timings DBT. This means that, when the data rate is low, a data center timing DCT with an appropriate timing may be set by using a synchronization clock that is generated by the clock recovery unit or by a synchronization clock that is transmitted from the transmission side. Further, the clock recovery unit detects the phase of the received signal from the data value of the digital output signal dn of the decision circuit at the timing DBT between the timings T1 and T2 before and after the data transition respectively, for example, and thus regenerates back the synchronization clock.

Figure 4B:
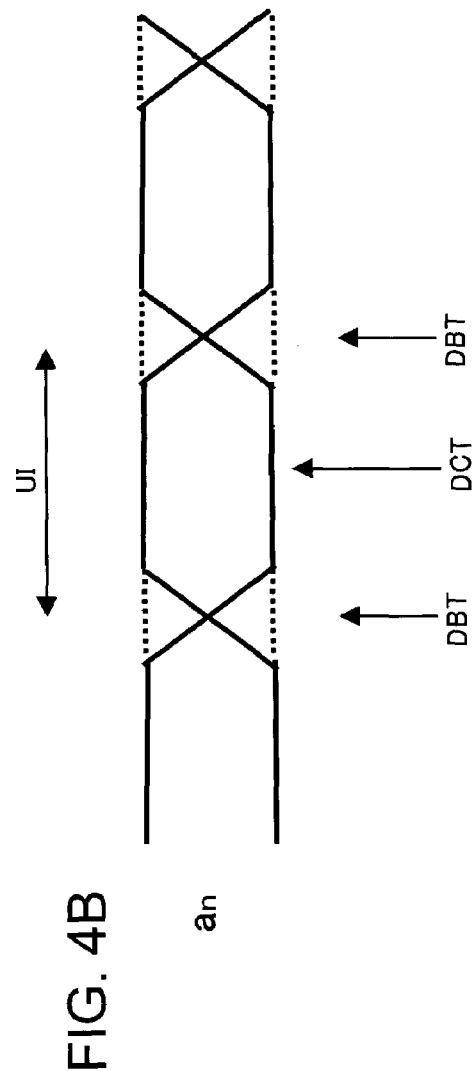

Meanwhile, FIG. 4B is a signal waveform for a case where the data rate is high. Because one cycle UI is short, unless the data center timing DCT is set highly accurately, the data cannot be judged appropriately. Further, although the use of an intermediate timing by using the data boundary timings DBT detected by the clock recovery unit may be considered, this does not necessarily mean that the high level and low level of the received signal are striking at an intermediate timing. It is therefore difficult to set the data center timing of the eye pattern highly accurately. In addition, when the data center timing DCT cannot be set highly accurately, the acquisition of ISI information at the data center timing DCT is also problematic and therefore the setting of appropriate equalization parameters is problematic.

First Embodiment

FIG. 5 is a constitutional view of the receiver circuit of the first embodiment. This receiver circuit comprises an equalizer 30, a data detection circuit 32, a demultiplexer 34, and an equalization parameter control unit 38 that controls the equalization characteristic parameter EQPR of the equalizer. Further, the pulse generation circuit 40, which generates a data sample timing clock ST1 for the detection circuit 32, is provided, and the pulse generation circuit 40 generates the data sample clock ST1 that is controlled at the data center timing DCT of the eye pattern by adding a controlled phase delay to the synchronization clock CLK. The phase delay is set by a delay amount control code DELAY that is generated by a data sample timing control unit 46.

The ISI detection circuit 42 comprises an analog-to-digital converter ADC that converts the analog output signal an into a digital signal at the timing of the sample timing ST2, and an error generator 44 that generates an error en=(dn−an), which is the amplitude difference between the digital signal dn of the data detection circuit 32 and the digital signal an(d), wherein the error generator 44 generates an ISI evaluation function $J=E\{en^2\}$. The ISI evaluation function J is supplied to the equalization parameter control unit 38 via a weighting circuit 52.

Figure 6:
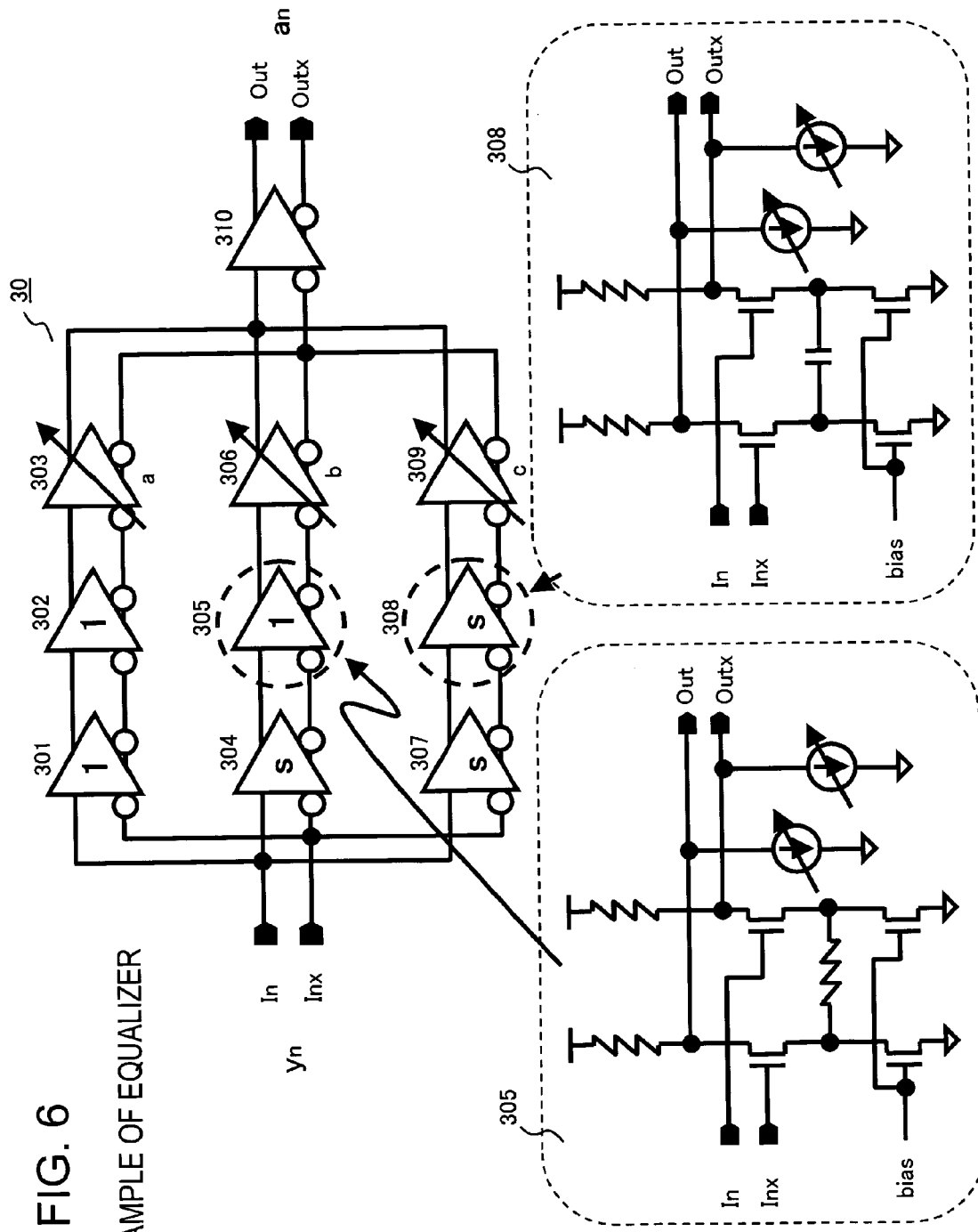
FIG. 6 is a constitutional view of an example of an equalizer.

FIG. 6 is constitutional view of an example of an equalizer. The equalizer in FIG. 6 comprises a signal path that comprises gates 301, 302 and 303, a signal path that comprises gates 304, 305, and 306, a signal path that comprises gates 307, 308, and 309, and a gate 310 that synthesizes the outputs of the three signal paths. The gates 301, 302, and 305 are gates that perform transfers without delaying signals, the gates 304, 307, and 308 are gates that perform shifts by delaying signals, and the gates 303, 306, and 309 are amplitude adjustment circuits that adjust the amplitude with gains a, b, and c respectively. Therefore, the gate 303 adjusts the amplitude of the current signal at factor a, the gate 306 adjusts the amplitude of the once-derived signal at factor b, and the gate 309 adjusts the amplitude of the twice-derived signal at factor c. As a result, an output signal an, in which the effect of the ISI of the preceding bit contained in the received signal yn is suppressed in accordance with the equalization parameters a, b, and c, is generated. Thus, the analog output signal an of the equalizer 30 is generated by multiplying the received signal yn by the equalization characteristic parameter EQPR of the equalizer and a, b, and c in the example in FIG. 6.

The equalization parameter control unit 38 in FIG. 5 finds the equalization characteristic parameter EQPR that minimizes the evaluation function J by means of a predetermined calculation. Methods for finding the equalization characteristic parameter EQPR include a method that finds the parameter EQPR by means of the approximation solution of the discrete-time system Wiener-Hopf equation or a method that finds the parameter EQPR by means of the LMS algorithm that simplifies the approximation solution of the discrete-time system Wiener-Hopf equation.

The receiver circuit of FIG. 5 comprises a timing control unit 46 in order to detect the data sample timing ST1 highly accurately even when the data rate is high. The timing control unit 46 comprises a timing detection circuit 48, which detects the optimum data sample timing corresponding with the data center timing of the eye pattern on the basis of the output an(d) of the analog-to-digital converter ADC and the output dn of the data decision circuit 32; and a delay code generation circuit 50, which generates the delay amount control code DELAY to establish the detected timing. The delay amount control code DELAY is required by the pulse generation circuit 40 and the pulse generation circuit 40 adds a delay amount that corresponds with the delay amount control code to the reference clock CLK to generate the data sample clock ST1 and a sample clock ST2 for the analog-to-digital converter ADC, and the like.

Figure 7B:
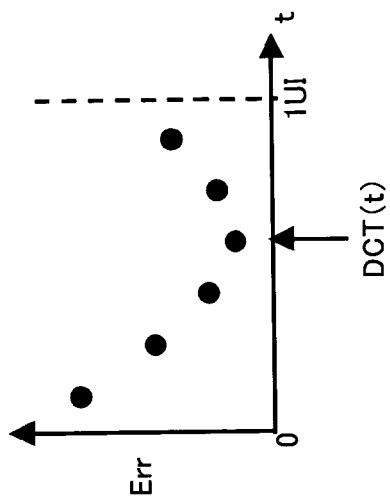
FIG. 7 illustrates the data sample timing decision method of this embodiment.
Figure 7A:
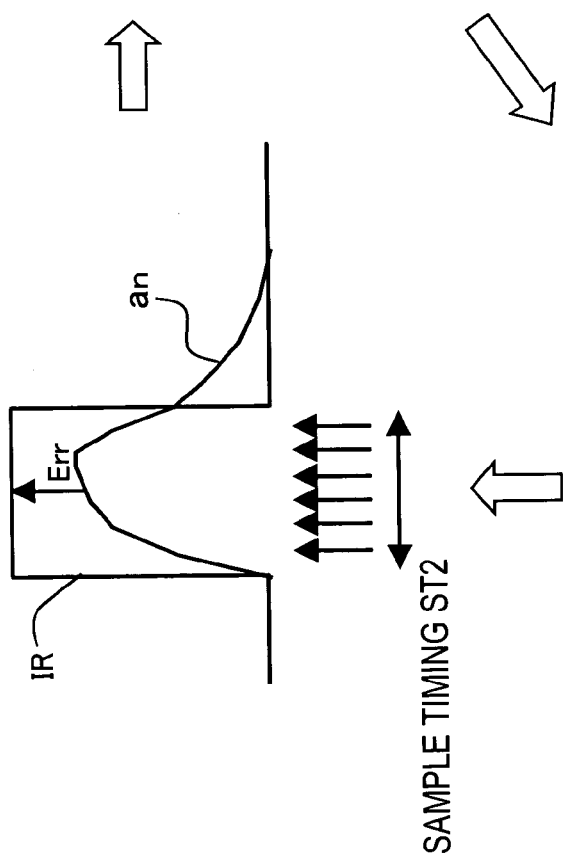
Figure 7C:
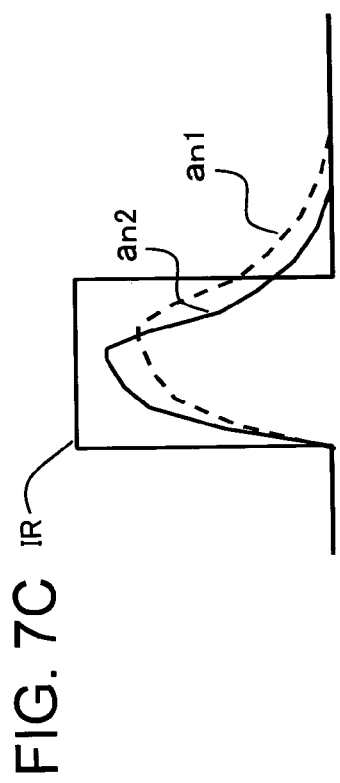

FIG. 7 illustrates the data sample timing detection method of this embodiment. When a data pattern is constituted from a single pulse, i.e. 00000010, the received signal an is subject to waveform distortion as shown in FIG. 7A as a result of the ISI that is generated during propagation of the single pulse in the transmission line. That is, when the received signal an has a shallow foot due to ISI, the waveform of the received signal an is distorted in comparison with the ideal received pulse IR. Accordingly, when the sample timing ST2 of the analog-to-digital converter ADC is scanned and the difference ERR=dn−an(d) between the AD-converted amplitude value an(d) and the digital signal dn corresponding to the ideal pulse is plotted for each timing, the results are as shown in FIG. 7B. That is, in one cycle 1UI, the difference Err is a minimum value at a certain timing. Therefore, the timing at which the difference Err has a minimum value can be regarded as the data center timing DCT of the eye pattern.

Accordingly, the ISI evaluation function J is found from the output signals an(d) and dn obtained at the sample timings ST1 and ST2 by matching the data sample timings ST1 and ST2 with the data center timing DCT, the equalization parameter EQPR with which the ISI evaluation function J has a minimum value is found, whereby the characteristic of the equalizer is controlled according to this equalization parameter. As a result, the waveform of the output signal an of the equalizer is closer to the ideal waveform than the output signal waveform an1 before the equalization parameter is controlled, as indicated by the solid line an2 in FIG. 7C. That is, the equalization parameter EQPR is optimized further and the ISI level is suppressed appropriately. The signal waveform an1 with the broken line corresponds with the signal waveform an of FIG. 7A.

Figure 8:
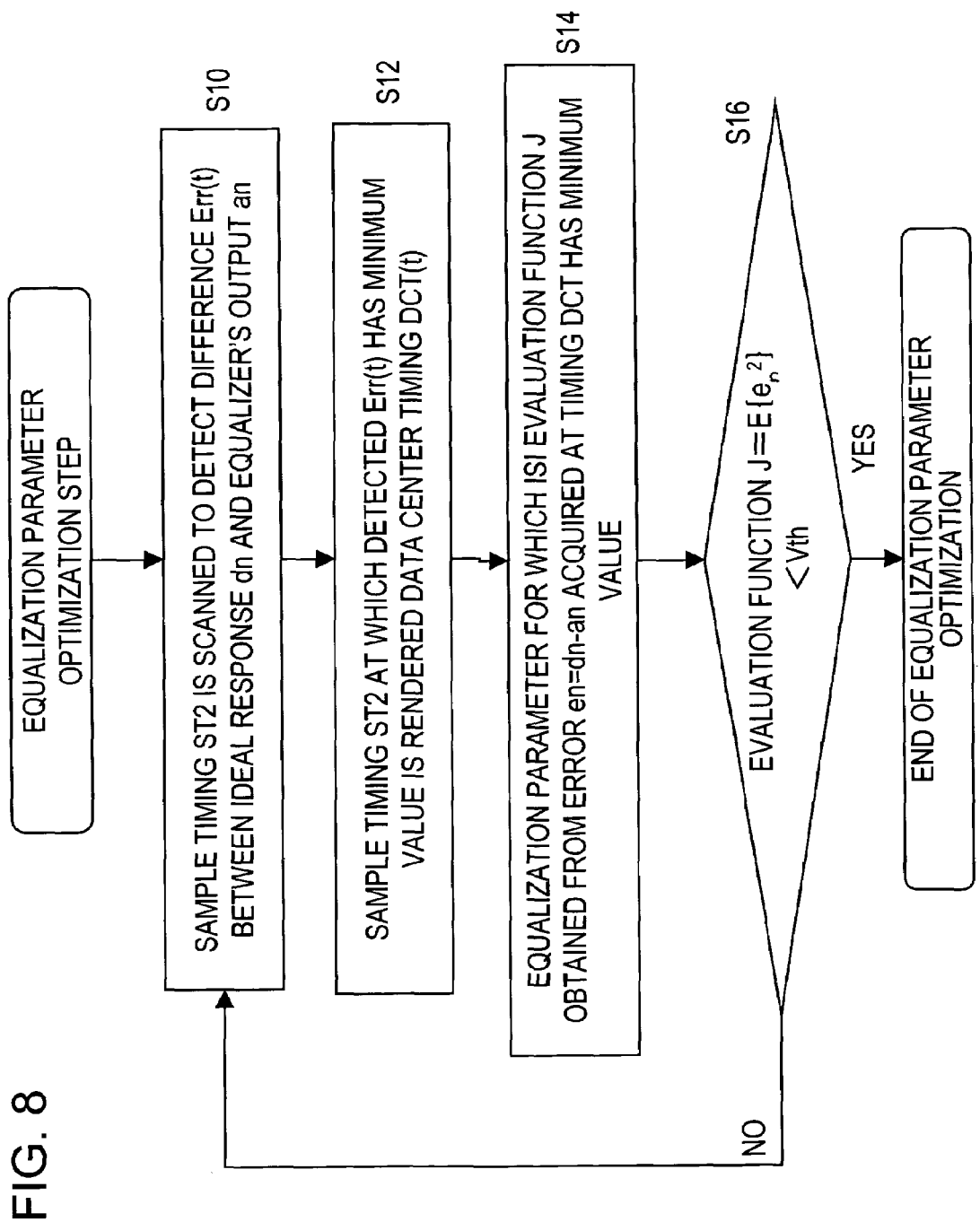
FIG. 8 is a flowchart of a step of optimizing the equalization parameters of this embodiment.

FIG. 8 is a flowchart of a step of optimizing the equalization parameters of this embodiment. As described above, the sample timing ST2 is scanned to detect the difference Err (t) (S10), and the sample timing ST2 at which the detected difference Err (t) has a minimum value is rendered the data center timing of the eye pattern (S12), whereby the equalization parameter for which the ISI evaluation function J acquired at timing DCT has a minimum value is found (S14). Further, the above steps S10 to S14 are repeated until the ISI evaluation function J that is acquired by means of this equalization parameter is smaller than the desired threshold value Vth (S16). By repeating control to change the equalization parameter of the equalizer by means of steps S10 to S14 in this manner, the ISI evaluation function converges and the characteristic of the equalizer can be optimized so that ISI is suppressed still further.

Returning now to FIG. 5, in the timing control unit 46, the timing detection circuit 48 detects the difference Err (t) in FIG. 7B by scanning the sample timing ST2 by changing the delay code DELAY by means of the delay code generation circuit 50 and outputs the delay amount control code DELAY corresponding with the sample timing ST2 for which the difference Err (t) has a minimum value to the delay code generation circuit 50. As a result, the sample clocks ST1 and ST2 of the timings corresponding with the delay amount control code DELAY are generated by means of the pulse generation circuit 40. Further, the ISI detection circuit 42 generates the ISI evaluation function J at the sample timing and supplies the ISI evaluation function J to the equalization parameter control unit 38 via the weighting circuit 52. The equalization parameter control unit 38 finds the equalization parameter EQPR that minimizes the ISI evaluation function J by means of the above method and supplies the equalization parameter EQPR to the equalizer 30. Waveshaping by means of the equalizer 30 the characteristic of which is adjusted by means of the equalization parameter is then performed and it is judged using the equalization parameter control unit 38 whether or not the ISI evaluation function J that corresponds with the wave-shaped output signal an is smaller than the threshold value Vth.

FIG. 9 illustrates the operating principles of a weighting circuit with respect to the ISI evaluation function J. The ISI evaluation function J is found from the signals an and dn that are sampled according to the data sample timing detected by the timing control unit 46 and the equalization parameter EQPR is found by calculating the ISI evaluation function J. When the characteristic of the equalizer is thus adjusted, there are cases where only the waveforms at the data sample timings ST1 and ST2 are shaped as per the signal an shown in FIG. 9A, while the other waveforms remain distorted.

Therefore, in the first embodiment, the weighting circuit 52 is provided and, as shown in FIG. 9B, the signals an and dn are sampled according to a second data sample timing (DCT−dt) with a phase that precedes the data sample timing DCT detected by the timing control unit 46 and according to a second data sample timing (DCT+dt) with a delayed phase, and the ISI evaluation functions J of the sampled signals an and dn are added according to a predetermined weighting. The weighting circuit 52 adds the evaluation functions J of the three sample timings DCT, DCT−dt and DCT+dt, for example, with predetermined weighting coefficients and supplies the result to the equalization parameter control unit 38 as an evaluation function. By finding the equalization parameter on the basis of the weighted evaluation function, the output an of the equalizer whose characteristic has been adjusted by means of the equalization parameter is wave-shaped to the ideal eye pattern as shown in FIG. 9B.

Figure 10:
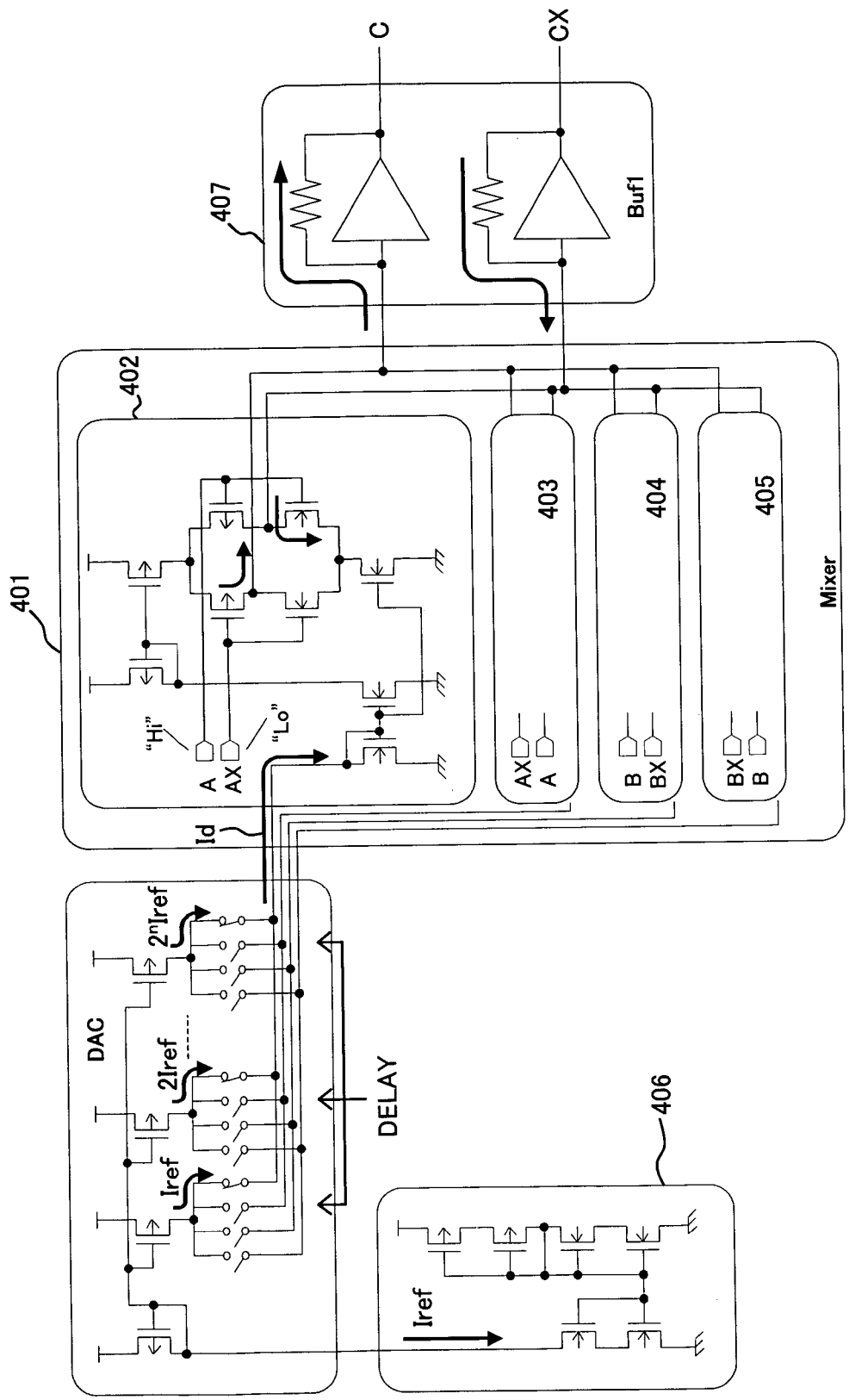
FIG. 10 is a constitutional view of an example of a pulse generation circuit 40.

FIG. 10 is a constitutional view of an example of the pulse generation circuit 40. The pulse generation circuit 40 adds a delay amount that corresponds with the delay amount control code DELAY to the reference clock CLK to generate the sample clock and the like of a timing that corresponds with the delay amount control code. The pulse generation circuit 40 shown in FIG. 10 comprises a reference current generation circuit 406 that generates a reference current Iref and a digital-to-analog converter DAC that generates a current that is a binary multiple, i.e. 1:2:4:8 . . . , of the reference current Iref as a current Id that is added in accordance with the delay amount control code DELAY. The digital-to-analog converter DAC converts the delay amount control code DELAY to the analog current Id. Further, the current Id, which is different in amount, is supplied as a reference current to delay gates 402, 403, 404, and 405 that are provided in the mixer 401 and, by appropriately weighting and mixing the phases of the input clocks A, AX, B, and BX, the timing controlled clocks C and CX are outputted by means of a buffer 407. That is, a timing-controlled or phase-controlled clock is outputted with a delay amount corresponding to the delay amount control code DELAY added to the reference clock. The timing-controlled clocks C and CX are the sample timing clocks ST1 and ST2 in FIG. 5.

As detailed above, in the first embodiment, a data center timing is provisionally detected on the basis of the error value Err of the analog output signal an of the equalizer and the equalization parameter is optimized to minimize the ISI information of this data center timing. ISI can be suitably suppressed by repeating this process. Therefore, a receiver circuit that appropriately suppresses ISI even when the data rate is high can be provided.

Second Embodiment

Figure 11:
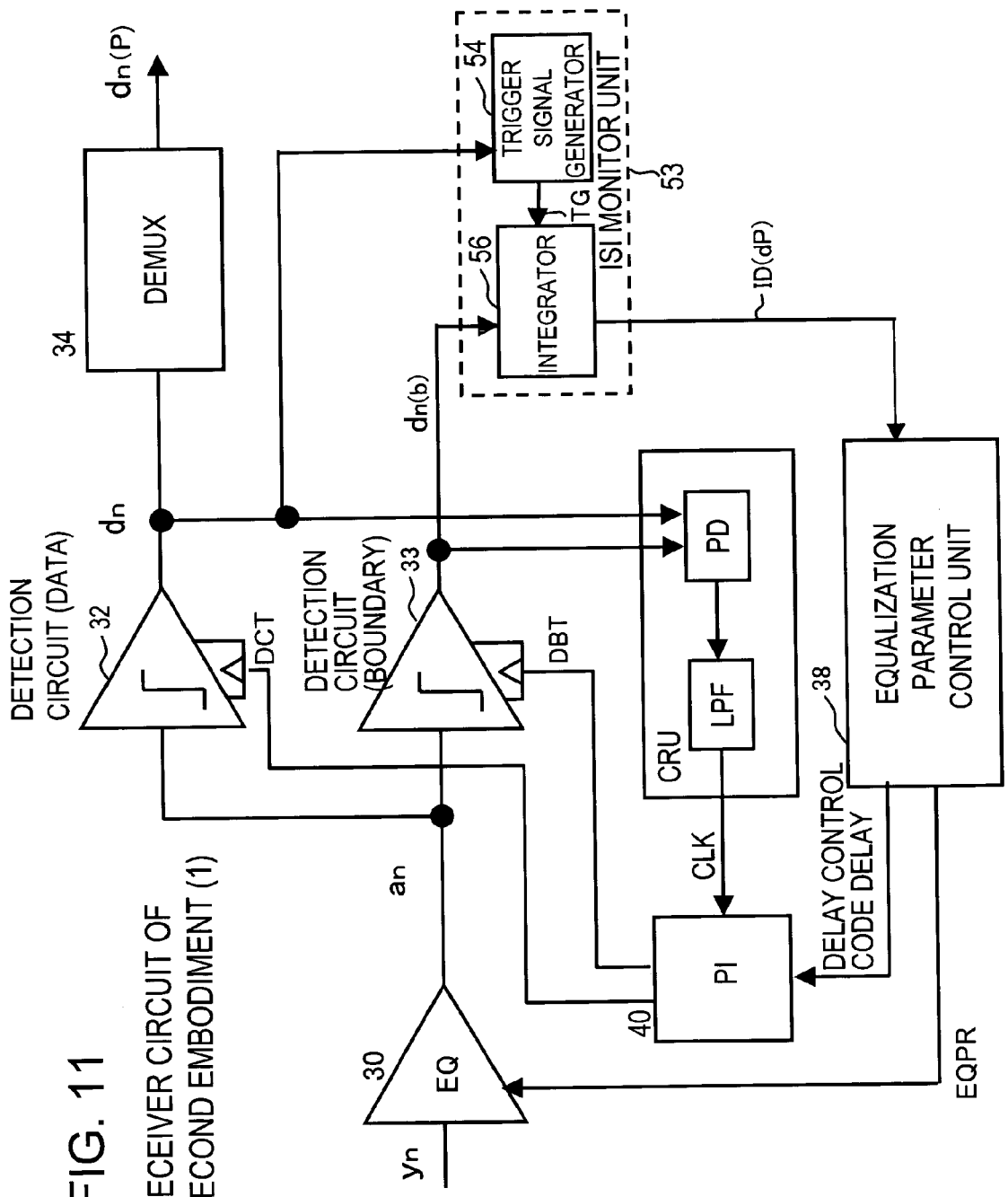
FIG. 11 is a constitutional view of the receiver circuit of a second embodiment.

FIG. 11 is a constitutional view of the receiver circuit of the second embodiment. In addition to the detection circuit 32, which judges the analog output signal an of the equalizer 30 at the data center timing DCT, this receiver circuit is provided with a detection circuit 33 that judges the analog output signal an at the data boundary timing DBT. Further, an ISI monitor unit 53, which detects the phase fluctuation amount at the data boundary of the analog output signal an of the equalizer 30 as ISI information, is also provided, wherein the equalization parameter control unit 38 determines the equalization parameter to minimize this phase fluctuation amount. Further, the pulse generation circuit 40 generates a data boundary timing clock DBT on the basis of the synchronization clock CLK generated by the clock recovery unit CRU and supplies the data boundary timing clock DBT to the detection circuit 33 as a sample clock. The pulse generation circuit 40 also generates a data center timing clock DCT on the basis of the synchronization clock CLK.

FIG. 12 is a theoretical diagram of the second embodiment. FIG. 12A is an eye pattern in which signals an corresponding with a data eye are displayed on top of one another. The phase fluctuation amount dP of a data eye that undergoes the changes L, H, L and the changes H, L, H corresponds to the ISI information. That is, when the ISI is not suppressed, the phase fluctuation amount dP of the data eye increases, whereas, when the ISI is appropriately suppressed, the phase fluctuation amount dP of the data eye is also reduced. Therefore, in the second embodiment, the ISI monitor unit 52, which acquires the phase fluctuation amount dP by means of any given method, is provided and supplies the phase fluctuation amount dP to the equalization parameter control unit 38 as ISI information.

FIG. 12B shows waveforms with boundaries (leading edges) of a data eye that corresponds to three data patterns. As is shown, the phase fluctuation amounts at the data boundaries of the data eye are different depending on the preceding data pattern. In the example in FIG. 12B, each of the phases of the edges corresponding to data patterns of three types are different. For example, supposing that the data pattern A is '1101', the data pattern B is '1001', the data pattern C is '0101', the phases of the edges from data 0 to data 1 are different in correspondence with the preceding data patterns '11', '10', and '01'.

FIG. 13 is a theoretical diagram of the second embodiment. FIG. 13A shows a detailed waveform at the boundary timings of the eye pattern. As mentioned earlier, the phases of the edges (cross points CP) of the data eye are different corresponding with the preceding data pattern. Further, the boundary sample timing DBT that is generated by the clock recovery unit CRU provided in the receiver circuit is controlled to an average position in the temporal direction of the cross points CP. Therefore, as shown in FIGS. 11 and 13B, the analog output signal an at the time of a certain data pattern is latched and detected at the boundary timing DBT by means of the boundary detection circuit 33 and the integral value ID of the detected data dn(b) is detected by the ISI monitor unit 53. That is, when the detection output dn(b) of the detection circuit 33 at the data boundary is at the high level, the decision value +1 is established and when the detection output dn(b) is at the low level, the decision value −1 is established. The phase fluctuation amount dP at the data boundary of the data pattern is determined in accordance with the integral value ID rendered by integrating the decision values of a plurality of detection outputs dn(b). As shown by the graph on the right side of FIG. 13B, the integral value ID of the decision value varies proportionally in accordance with the sample timing DBT and therefore the fact that the integral value ID corresponds with the phase difference between the sample timing DBT and the center of the edge (t=0), i.e. the phase fluctuation amount dP, is utilized.

Returning now to FIG. 11, the ISI monitor unit 53 comprises a trigger signal generator 54, which inputs data dn of the detection circuit 32 that makes a data detection of an at the data center timing DCT, detects the preceding data pattern, and generates a trigger signal TG when there is a match with the data pattern of interest; and an integrator 56, which integrates, at fixed intervals, "+1" or "−1" of the data dn(b) that is judged at the boundary timing DBT when this trigger signal TG is provided. The value ID, which is integrated by means of an integrator 56 for each of a plurality of data patterns, is supplied to the equalization parameter control unit 38 as ISI information. As detailed earlier, the integral value ID corresponds with the boundary phase fluctuation amount dP of the output signal an of the equalizer 30.

The equalization parameter control unit 38 finds the optimal value of the equalization parameter EQPR so that the absolute values of the integral values ID corresponding with the plurality of data patterns are all reduced, and controls the characteristic of the equalizer 30 in accordance with the equalization parameter. Alternatively, the equalization parameter control unit 38 controls the equalization parameter EQPR so that the maximum values of the integral values ID corresponding with the plurality of data patterns are reduced and repeats the optimization process for the equalization parameter with respect to maximum values. Hence, a method that finds the phase fluctuation amount for every data patterns and minimizes each of these phase fluctuation amounts to a predetermined minimum value is the same as a method that finds the characteristics (phases) of a plurality of frequencies contained in the signal an and makes these characteristics (phases) certain minimum values.

Figure 14:
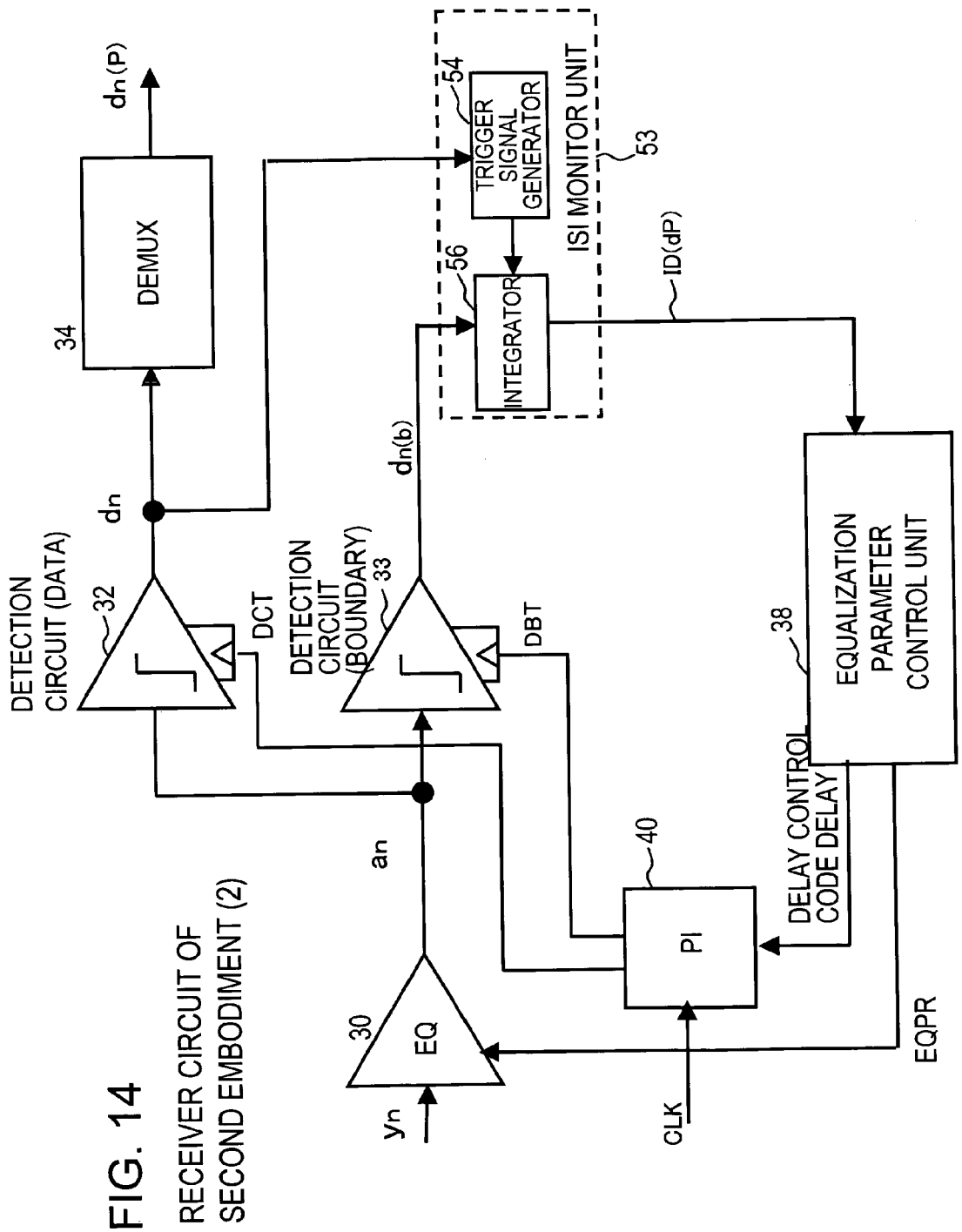
FIG. 14 shows a modified example of the receiver circuit of the second embodiment.

FIG. 14 shows a modified example of the receiver circuit of the second embodiment. In this modified example, the clock recovery unit CRU of the receiver circuit of FIG. 11 is not provided. In the clock recovery unit CRU in FIG. 11, a phase detector PD detects the phase of the received signal according to the data dn detected at the data center timing DCT with respect to the received signal and according to the data dn(b) detected at the data boundary timings DBT, extracts the phase of the low frequency component by means of a low pass filter LPF the cutoff frequency of which is set to enable detection of the frequency deviation between the transmitter device and the receiver device, and thus generates the synchronization clock CLK. On the other hand, in the example in FIG. 14, the synchronization clock CLK is transmitted together with data from the transmission side, and the received synchronization clock CLK is supplied to the pulse generation circuit 40. As shown in FIG. 10, the pulse generation circuit numeral 40 adds a delay, which is controlled by the reference clock CLK in accordance with the delay control code DELAY, and generates the boundary sample clock DBT and the data center sample clock DCT, and so forth.

Figure 15:
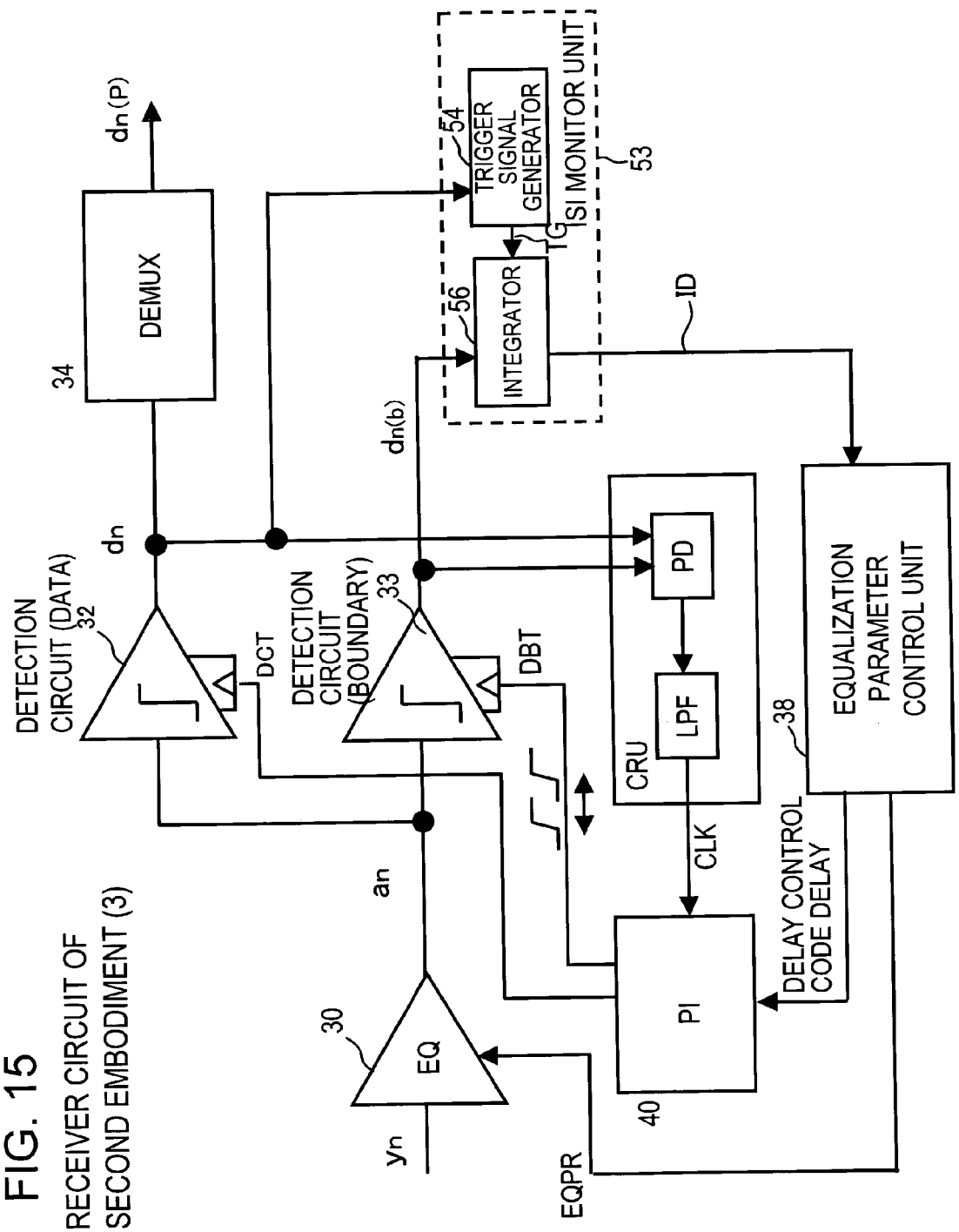
FIG. 15 shows another receiver circuit of the second embodiment.

FIG. 15 shows another receiver circuit of the second embodiment. The receiver circuits in FIGS. 11 and 14 detect the phase fluctuation amount dP of the data boundary of the analog output signal an of the equalizer by means of the integral value of the data dn(b) detected at the boundary timings DBT. However, this data dn(b) is only an indication of the magnitude correlation of the phase fluctuation amount dP and does not indicate the size of the phase fluctuation amount. In addition, when the degree of equalization is insufficient, the detection data dn(b) detected at the boundary timing DBT found by means of the clock recovery unit is "+1" or "−1" and therefore the integral values are the same for different data patterns and the magnitude correlation cannot be clearly distinguished. On the other hand, the receiver circuit in FIG. 15 uses the delay amount control code DELAY for the pulse generation circuit 40 to change the boundary timing DBT of the decision circuit 33 and detects the size of the phase variation amount dP on the basis of the integral value ID.

Figure 16A:
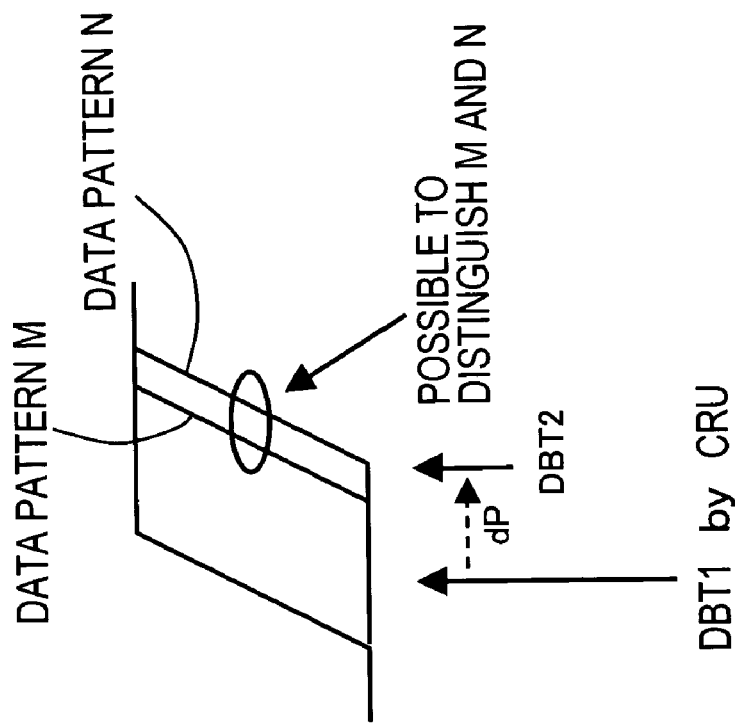
FIG. 16 is a theoretical diagram of the receiver circuit of FIG. 15.
Figure 16B:
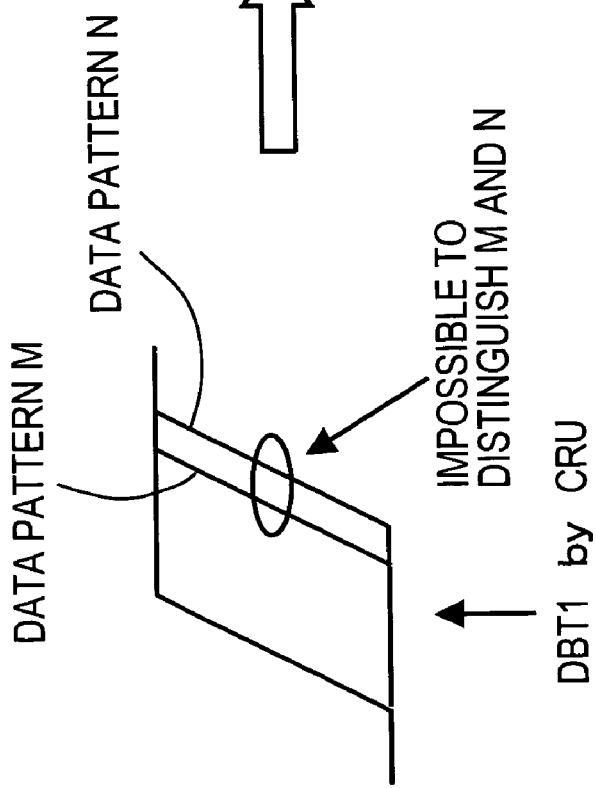

FIG. 16 is a theoretical diagram for the receiver circuit of FIG. 15. FIG. 16 shows the edge part of the data eye. As shown in FIG. 16A, the data eye contains the edge waveforms for a plurality of data patterns. However, because the decision data dn(b) of the data patterns M and N are both at the low level at the boundary timing DBT1 obtained by means of the clock recovery unit CRU or the like, it is difficult to distinguish these decision data. As mentioned earlier, particularly in cases where the degree of equalization is insufficient, the phase fluctuation amounts at the boundary are large and, at the boundary timing DBT1, the decision data dn(b) are the same, which makes a distinction therebetween problematic. On the other hand, as shown in FIG. 16B, the decision data dn(b) for data patterns M and N can be distinguished at timing DBT2, which is rendered by changing the phase of the sample timing of the boundary data decision circuit 33 from boundary timing DBT1.

Therefore, the equalization parameter control unit 38 in FIG. 15 scans the phases of the sample clocks DBT in the boundary data detection circuit 33 by changing the delay amount control code DELAY, and thus judges whether the integral values ID obtained for each of the sample clocks are distinguishable. The equalization parameter control unit 38 then detects the delay amount dP of the sample clock DBT2, which is controlled, when distinguishable, by the integral value ID generated by the ISI monitor unit 52 as the phase fluctuation amount dP of the data pattern M. The equalization parameter EQPR is then adjusted so that the phase fluctuation amount dP is made smaller than a predetermined threshold value. When the characteristic of the equalizer 30 is adjusted so that the phase fluctuation amount dP of the data eye boundary is small, the analog output signal an, in which ISI is appropriately suppressed based on the relationship between the ISI and the phase fluctuation amount dP, is then generated.

In the receiver circuit in FIG. 15, the ISI monitor unit 53 generates the integral value ID of the decision data dn(b) at the sample timing DBT for a predetermined data pattern and the equalization parameter control unit 38 changes the sample timing DBT to find, as the phase fluctuation amount dP, the delay amount with which the integral value ID is distinguishable between different data patterns. Therefore, because the size of the phase fluctuation amount dP has been detected, the optimization process for the equalization parameter can be ended when the phase fluctuation amount dP is at a predetermined threshold value. On the other hand, in the case of the receiver circuit in FIGS. 11 and 14, because the equalization parameter is optimized on the basis of the integral value ID, which indicates the magnitude of the phase fluctuation amount, the end of the optimization process for the equalization parameter cannot be detected appropriately and the process must usually be repeated.

Although the receiver circuit in FIG. 15 is provided with the clock recovery unit CRU, when the transmission side transmits the synchronization clock, the clock recovery unit CRU is not required as shown in FIG. 14.

As detailed above, in the second embodiment, even when the data rate is high, the phase fluctuation amount dP at the data eye data boundary can be detected, and by using the phase fluctuation amount dP as ISI information, the equalization parameter can be optimized to reduce the phase fluctuation amount dP.

Third Embodiment

FIG. 17 shows the receiver circuit of a third embodiment. In the third embodiment, the ISI monitor unit 53 detects the amplitude fluctuation amount dAM of the analog output signal an of the equalizer 30 at the data boundary timing DBT and the equalization parameter control unit 38 controls the characteristic parameter EQPR of the equalizer 30 to reduce the amplitude fluctuation amount dAM.

Figure 18A:
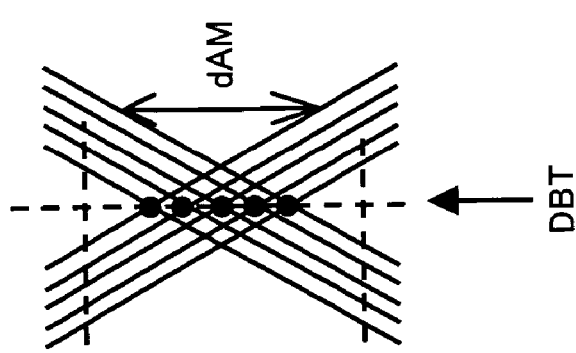
FIG. 18 is a theoretical diagram of the third embodiment.
Figure 18B:
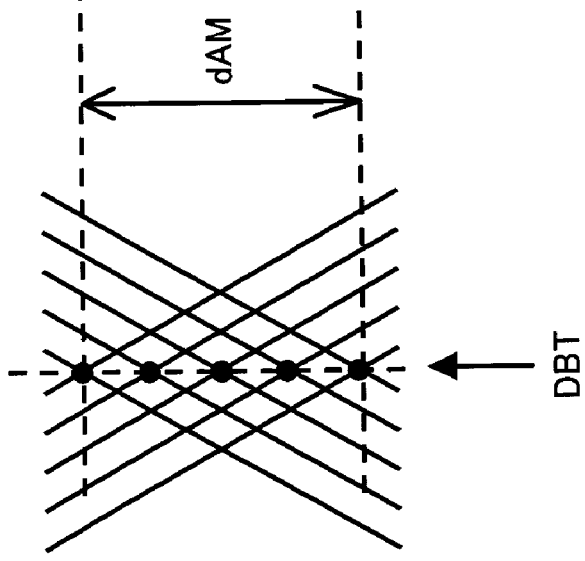

FIG. 18 is a theoretical diagram of the third embodiment. FIG. 18A is an eye pattern close to the boundary DBT before equalization of the received signal yn and FIG. 18B is an eye pattern close to the boundary after equalization. Because ISI has not been removed or suppressed from the eye pattern before equalization, the eye pattern at the boundary exhibits phase fluctuations in the temporal direction and amplitude fluctuations dAM in the amplitude direction. In addition, when ISI is suppressed through equalization, the phase fluctuation amount and amplitude fluctuation amount are small, as shown in FIG. 18B. In the second embodiment, the phase fluctuation amount is monitored and optimization of the equalization parameter is performed with the phase fluctuation amount serving as the ISI information. On the other hand, in the third embodiment, the amplitude fluctuation amount is monitored and optimization of the equalization parameter is performed with the amplitude fluctuation amount serving as the ISI information. That is, optimization of the equalization parameter is performed so that the amplitude fluctuation amount dAM is small or smaller than a predetermined threshold value.

Therefore, the ISI monitor unit 53 of the receiver circuit shown in FIG. 17 comprises a converter ADC, which performs analog-to-digital conversion of the analog output signal an of the equalizer 30 at the boundary sample timing DBT, and an amplitude fluctuation amount detector 74, which detects the amplitude fluctuation amount dAM on the basis of the output an(d). Further, the equalization parameter control unit 38 adjusts the characteristic parameter EQPR of the equalizer so that the detected amplitude fluctuation amount dAM is small or smaller that a predetermined threshold value.

The receiver circuit in FIG. 17 comprises a boundary timing detection unit 60, which detects the boundary timing of the signal an highly accurately. This boundary timing detection unit 60 comprises a data transition detector 64, which monitors the decision data dn of the data detection circuit 32 and detects the times of transition of the decision data dn, a processor 62, which generates average values AVE for the amplitude values an(d) by multiplying the amplitude values an(d) detected by the ADC by the decision data "+1" and "−1", a selector 66, which selects the average values AVE of the amplitude values an(d) at the time of data transitions, an integrator 68, which integrates the average values AVE selected by the selector, a decision unit 70, which judges when the integral value of the integrator 68 is the minimum value, and a delay control code generator 72, which generates a delay control code DELAY for the pulse generation circuit 40. The operation of the boundary timing detection unit 60 will be described hereinbelow.

Figure 19:
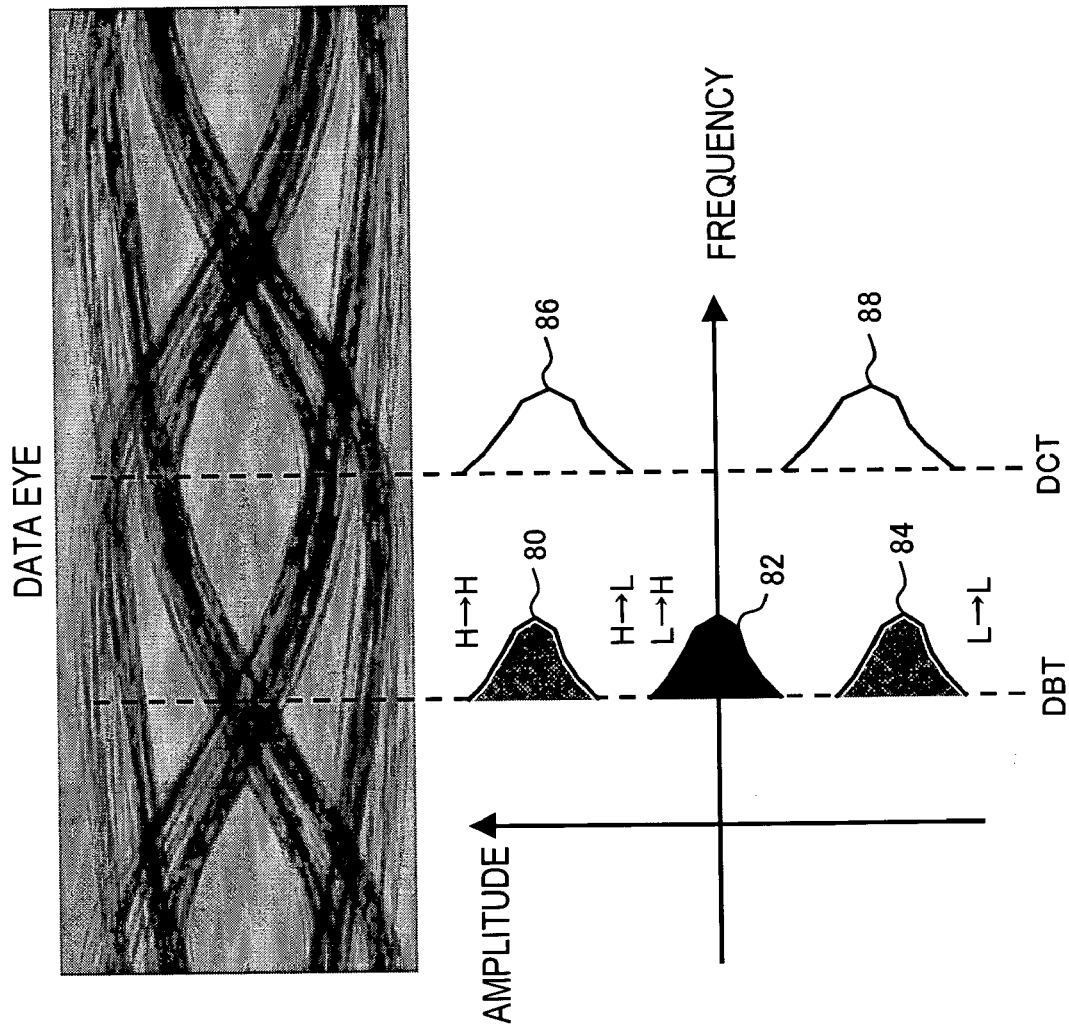
FIG. 19 is a theoretical diagram of boundary timing detection.
Figure 20:
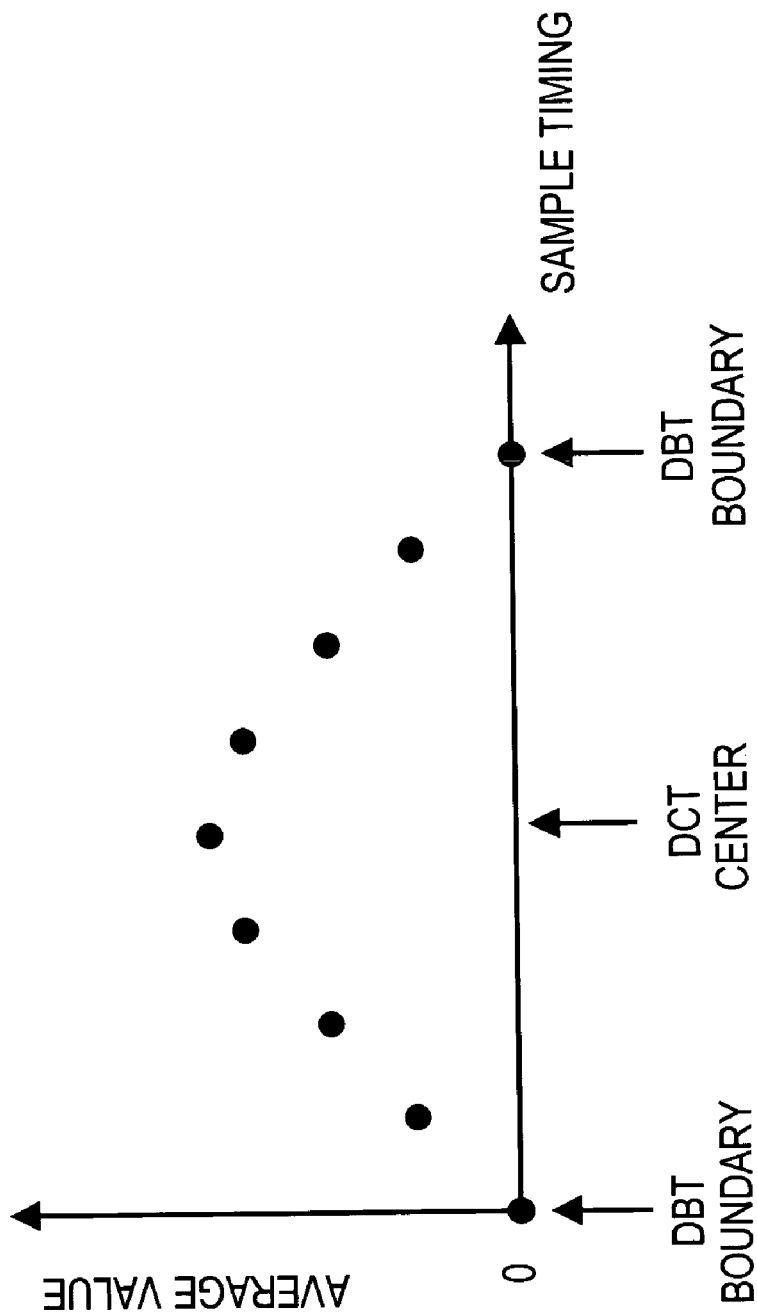
FIG. 20 is a theoretical diagram of boundary timing detection.

FIGS. 19 and 20 are theoretical diagrams for boundary timing detection. FIG. 19 shows the frequency of the amplitude value an(d) of the ADC output sampled at the data center timing DCT and the frequency of the amplitude value an(d) of the output of the converter ADC sampled at the data boundary timing DBT with respect to a data eye. At the data center timing DCT, two kinds of amplitude values 86, 88, which are high-level and low-level amplitude values respectively, are detected by means of the AD converter ADC. On the other hand, at data boundary timing DBT, an amplitude value 82 with a zero amplitude value is detected in addition to the high-level and low-level amplitude values 80 and 84 respectively. Therefore, by first extracting a data eye exhibiting data transitions, multiplying the outputs an(d) of the AD converter ADC for this data eye by the polarities "+1" and "−1" of the output data of the data detection circuit 32, and adding the multiplied value, the average value of the absolute values of the outputs an(d) can be found. As a result of this average value calculation, in the AD conversion at the data center timing DCT, the average value increases according to the amplitude values 86 and 88, whereas, in the AD conversion at the data boundary timing DBT, the average value is reduced according to the amplitude value 82. Further, the amplitudes 80 and 84 are removed from the integration target of the integrator 68 by extracting the data eye exhibiting data transitions by means of the selector 66.

FIG. 20 shows the average value (or integral value of the average value) when the sample timing of the AD converter ADC is changed between the boundary DBT, the center DCT, and boundary DBT. As mentioned earlier, the average value increases at the center timing DCT and decreases at the boundary timing DBT. Therefore, in the boundary timing detection unit 60 in FIG. 17, the decision unit 70 judges when the output of the integrator 68 shown in FIG. 20 reaches a minimum value.

Returning now to FIG. 17, the boundary timing detection unit 60 scans the sample timing of the AD converter ADC by changing the delay amount control code DELAY by means of the delay amount control code generator 72. Thereafter, at each sample timing, the average values of the data eye exhibiting data transitions are extracted by means of the selector 66 from among the average values AVE of the outputs an(d) of the AD converter ADC and then integrated by means of the integrator 68. The decision unit 70 then compares the integral values at the plurality of sample timings and detects the sample timing at which the integral value is minimal. As a result, the data boundary timing is detected highly accurately.

Therefore, the delay amount control code DELAY is controlled to the detected data boundary timing DBT and a sample clock DBT that matches the data boundary timing is then supplied to the AD converter ADC by means of the pulse generation circuit 40. The amplitude fluctuation amount detector 74 then detects the amplitude fluctuation amount dAM from the fluctuation value an(d) at the boundary timing DBT, which is controlled highly accurately. The equalization parameter control unit 38 then adjusts the equalization parameter EQPR to reduce the amplitude fluctuation amount dAM.

Thus, in the third embodiment, ISI information is acquired without detecting ISI information at the data center timing. In order to detect the amplitude fluctuation amount dAM at the data eye boundary, which is the ISI information, the data boundary timing must be detected highly accurately. However, this data boundary timing can be detected highly accurately, as described earlier, from the received AD conversion value an(d) of the data eye and the data decision value dn. Therefore, in the case of the third embodiment, even when the data rate is high, ISI information can be detected appropriately and the equalization parameter where by ISI can be optimally suppressed can be detected.

What is claimed is:

1. A receiver circuit for receiving a received signal that propagates through a transmission medium, comprising:
   an equalizer that equalizes the received signal;
   a data detection circuit that detects an analog output signal of the equalizer at a data sample timing and outputs a digital signal;
   an intersymbol interference detection circuit that detects an intersymbol interference level from the analog output signal of the equalizer at the data sample timing and from the digital signal;
   an equalizer characteristic control unit that controls the characteristic of the equalizer to minimize the intersymbol interference level detected by the intersymbol interference detection circuit; and
   a data sample timing control unit in which the data sample timing is controlled to a first data sample timing at which the difference between the amplitude of the analog output waveform of the equalizer with respect to an impulse and an amplitude of an ideal impulse response waveform is minimal.

2. The receiver circuit according to claim 1, wherein the data sample timing control unit detects the first data sample timing at which the difference is minimal;
   the intersymbol interference detection circuit detects a first intersymbol interference level on the basis of the first data sample timing; and
   a characteristic adjustment process, in which the equalization characteristic control unit adjusts the characteristic of the equalizer on the basis of the intersymbol interference level thus detected, is repeated.

3. The receiver device according to claim 1, wherein the intersymbol interference detection circuit further detects a second intersymbol interference level at a second data sample timing at which phase lags behind or lies in advance of the phase at the first data sample timing; and
   the equalization characteristic control unit controls the characteristic of the equalizer to reduce the second intersymbol interference level.

4. The receiver circuit according to claim 3, wherein the equalization characteristic control unit controls the characteristic of the equalizer to reduce an added intersymbol interference level that is rendered by adding, on the basis of predetermined weighting, the first intersymbol interference level and the second intersymbol interference level.

5. A receiver circuit for receiving a received signal that propagates through a transmission medium, comprising:
   an equalizer that equalizes the received signal;
   a data detection circuit that detects, at a data sample timing, an analog output signal of the equalizer and outputs a digital signal; and
   an equalization characteristic control unit that detects a phase fluctuation amount at a data boundary of the analog output signal of the equalizer and controls the characteristic of the equalizer to reduce the phase fluctuation amount at the data boundary.

6. The receiver circuit according to claim 5, wherein the equalization characteristic control unit detects the amplitude of the analog output signal at a boundary timing for each combination data of the digital signal of the data detection circuit and detects the phase fluctuation amount at the data boundary in accordance with the amplitude thus detected.

7. The receiver circuit according to claim 6, wherein the equalization characteristic control unit integrates the amplitudes detected for each of the combination data a plurality of times and detects the phase fluctuation amount at the data boundary in accordance with the maximum value of the amplitudes thus integrated.

8. The receiver circuit according to claim 6, wherein the equalization characteristic control unit controls the characteristic of the equalizer so that the phase fluctuation amount at the data boundary corresponding with all the combination data found in accordance with the amplitudes detected for each combination data is less than a predetermined threshold value.

9. The receiver circuit according to claim 5, wherein the equalization characteristic control unit detects the sample timing at which the first and second amplitudes corresponding with first and second combination data, which are amplitudes of the analog output signal to be sampled in correspondence with the combination data items of the digital signal of the data detection circuit, are distinguishable, and detects the phase fluctuation amount at the data boundary in accordance with the difference between the boundary timing and the detected sample timing.

10. The receiver circuit according to claim 9, wherein the equalization characteristic control unit detects the sample timing at which the first and second amplitudes are distinguishable by scanning the sample timings with the boundary timing serving as the starting point.

11. A receiver circuit for receiving a received signal that propagates through a transmission medium, comprising:
an equalizer that equalizes the received signal;
a data detection circuit that detects an analog output signal of the equalizer at a data sample timing and outputs a digital signal; and
an equalization characteristic control unit that detects the amplitude fluctuation amount at a data boundary of the analog output signal of the equalizer and controls the characteristic of the equalizer to reduce the amplitude fluctuation amount at the data boundary.

12. The receiver circuit according to claim 11, further comprising:
a boundary timing detection unit that detects the amplitude of the analog output signal at the sample timing when the digital signal of the data detection circuit undergoes a data transition and detects the sample timing at which the detected amplitude is minimal,
wherein the equalization characteristic control unit detects the amplitude fluctuation amount at the data boundary in accordance with the amplitude of the analog output signal at the sample timing detected by the boundary timing detection unit.

13. The receiver circuit according to claim 12, wherein the boundary timing detection unit integrates the absolute values of the amplitude of the analog output signal and detects the sample timing at which the integral value is a minimum value.

* * * * *